US012688624B2

(12) United States Patent
Kato et al.

(10) Patent No.: US 12,688,624 B2
(45) Date of Patent: Jul. 21, 2026

(54) IMAGE DRAWING METHOD PERFORMED BY REMOTE-SIDE APPARATUS AND LOCAL-SIDE APPARATUS

(71) Applicant: Wacom Co., Ltd., Saitama (JP)

(72) Inventors: Tatsunori Kato, Saitama (JP); Yoshifumi Takebe, Saitama (JP); Kiyokazu Sakai, Saitama (JP); Sadao Yamamoto, Saitama (JP); Naoki Watanabe, Saitama (JP)

(73) Assignee: Wacom Co., Ltd., Saitama (JP)

( * ) Notice: Subject to any disclaimer, the term of this patent is extended or adjusted under 35 U.S.C. 154(b) by 396 days.

(21) Appl. No.: 18/335,043

(22) Filed: Jun. 14, 2023

(65) Prior Publication Data

US 2023/0326103 A1 Oct. 12, 2023

Related U.S. Application Data

(63) Continuation of application No. PCT/JP2021/046499, filed on Dec. 16, 2021.

(30) Foreign Application Priority Data

Dec. 16, 2020 (JP) ................................. 2020-208723
Oct. 2, 2021 (JP) ................................. 2021-163158

(51) Int. Cl.
*G06T 11/20* (2026.01)
*G06F 3/0354* (2013.01)
(Continued)

(52) U.S. Cl.
CPC .......... *G06T 11/20* (2013.01); *G06F 3/03545* (2013.01); *G06F 3/04883* (2013.01); *G06T 11/10* (2026.01)

(58) Field of Classification Search
None
See application file for complete search history.

(56) References Cited

U.S. PATENT DOCUMENTS 8,564,555 B2 10/2013 Day et al.
9,721,365 B2 8/2017 Worfolk
(Continued)

FOREIGN PATENT DOCUMENTS

JP 2015056844 A 3/2015
JP 2016110603 A 6/2016
(Continued)

OTHER PUBLICATIONS

English Translation of International Search Report, mailed Feb. 22, 2022, for International Patent Application No. PCT/JP2021/046499. (2 pages).

(Continued)

*Primary Examiner* — Sarah Le
(74) *Attorney, Agent, or Firm* — Seed Intellectual Property Law Group LLP

(57) ABSTRACT

An image drawing method performed by first and second computers is provided. The image drawing method includes: transmitting, by the second computer, a streaming video that includes a pen stroke image generated by a first rendering process; generating, by the first computer, a pen stroke image by performing a second rendering process, which is shared with the first rendering process, in parallel with the first rendering process; receiving, by the first computer, the streaming video from the second computer via communication that incurs a delay; compositing, by the first computer, the pen stroke image into the streaming video; and outputting, by the first computer, the streaming video. The image (Continued)

drawing method enables alignment of appearances between a provisional image and the pen stroke image that appears within the streaming video.

34 Claims, 14 Drawing Sheets

(51) Int. Cl.
  *G06F 3/04883*    (2022.01)
  *G06T 11/10*    (2026.01)

(56)          References Cited

U.S. PATENT DOCUMENTS

| | | | |
|---|---|---|---|
| 9,792,517 B2 | 10/2017 | Petkov et al. | |
| 11,205,308 B1 * | 12/2021 | Chen | G06T 7/593 |
| 2005/0162413 A1 | 7/2005 | Dresevic et al. | |
| 2011/0208807 A1 * | 8/2011 | Shaffer | G06F 3/0418 |
| | | | 709/205 |
| 2012/0004039 A1 * | 1/2012 | Perry | A63F 13/335 |
| | | | 463/42 |
| 2016/0147436 A1 * | 5/2016 | Tsutsui | G06F 3/04883 |
| | | | 715/268 |
| 2018/0203599 A1 * | 7/2018 | Angelov | G06F 3/0414 |

FOREIGN PATENT DOCUMENTS

| | | |
|---|---|---|
| WO | WO 2016117340 A1 | 7/2016 |
| WO | 2020136729 A1 | 7/2020 |

OTHER PUBLICATIONS

Partial Supplementary European Search Report, dated Apr. 24, 2024, for European Patent Application No. 21906686.7-1207. (14 pages).

* cited by examiner

F I G . 1
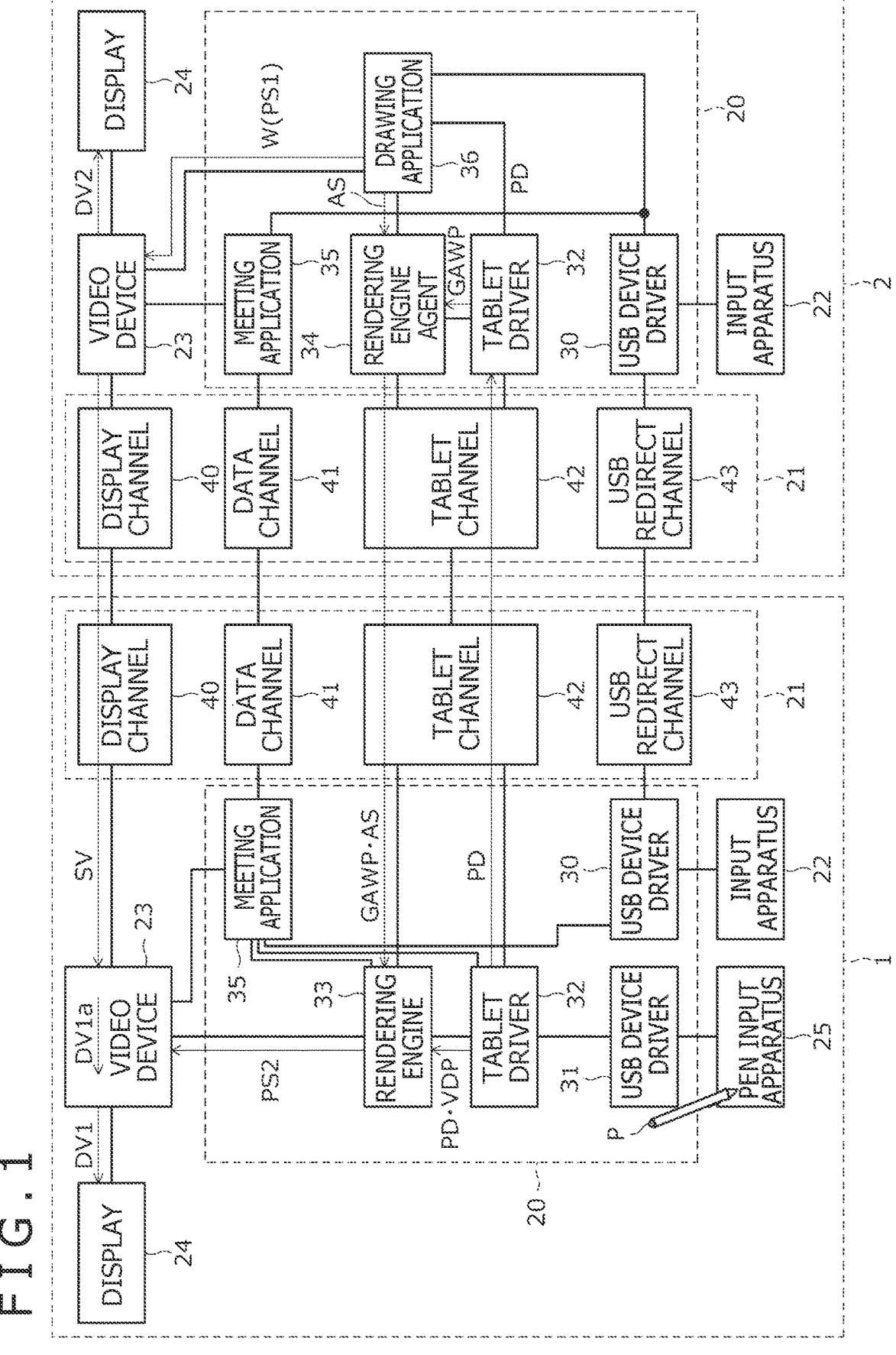

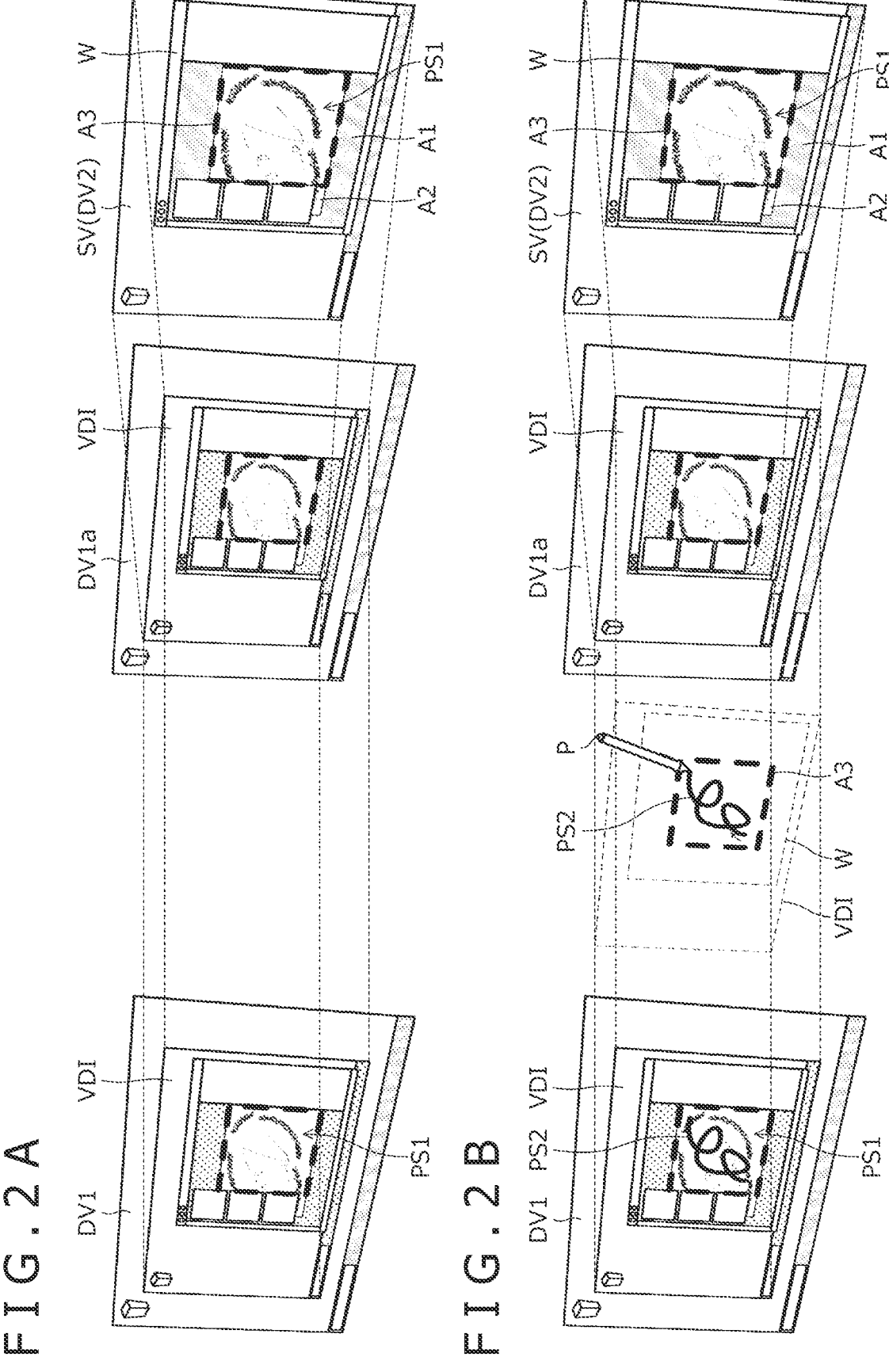
F I G . 2 A
F I G . 2 B

FIG.3

| PEN DATA |
|---|
| CURSOR INFORMATION |
| BUTTON INFORMATION |
| COORDINATE DATA |
| PEN PRESSURE INFORMATION |
| AIRBRUSH WHEEL INFORMATION |
| INCLINATION INFORMATION |
| ROTATION INFORMATION |

| HISTORICAL DATA |
|---|
| PEN DATA HISTORY |

| BRUSH DATA |
|---|
| FUNCTION INFORMATION |
| COLOR INFORMATION |
| SIZE INFORMATION |
| PEN TIP SHAPE INFORMATION |
| BRUSH SELECTION CANCELLATION INFORMATION |
| PATTERN BITMAP |
| COARSENESS/FINENESS DATA |
| COARSENESS/FINENESS RANDOMNESS |
| COARSENESS/FINENESS RANDOM NUMBER SEED |
| ORIENTATION DATA |
| ORIENTATION RANDOMNESS |
| ORIENTATION RANDOM NUMBER SEED |

FIG.4A

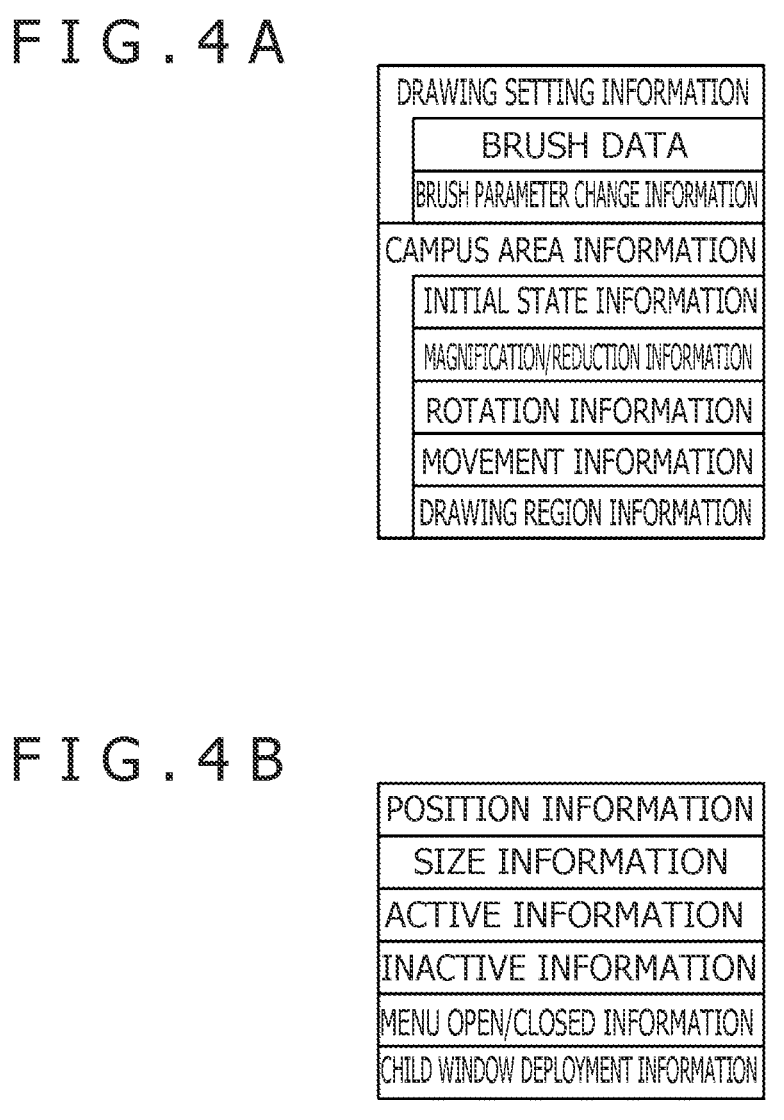

| DRAWING SETTING INFORMATION |
|---|
| BRUSH DATA |
| BRUSH PARAMETER CHANGE INFORMATION |
| CAMPUS AREA INFORMATION |
| INITIAL STATE INFORMATION |
| MAGNIFICATION/REDUCTION INFORMATION |
| ROTATION INFORMATION |
| MOVEMENT INFORMATION |
| DRAWING REGION INFORMATION |

FIG.4B

| POSITION INFORMATION |
|---|
| SIZE INFORMATION |
| ACTIVE INFORMATION |
| INACTIVE INFORMATION |
| MENU OPEN/CLOSED INFORMATION |
| CHILD WINDOW DEPLOYMENT INFORMATION |

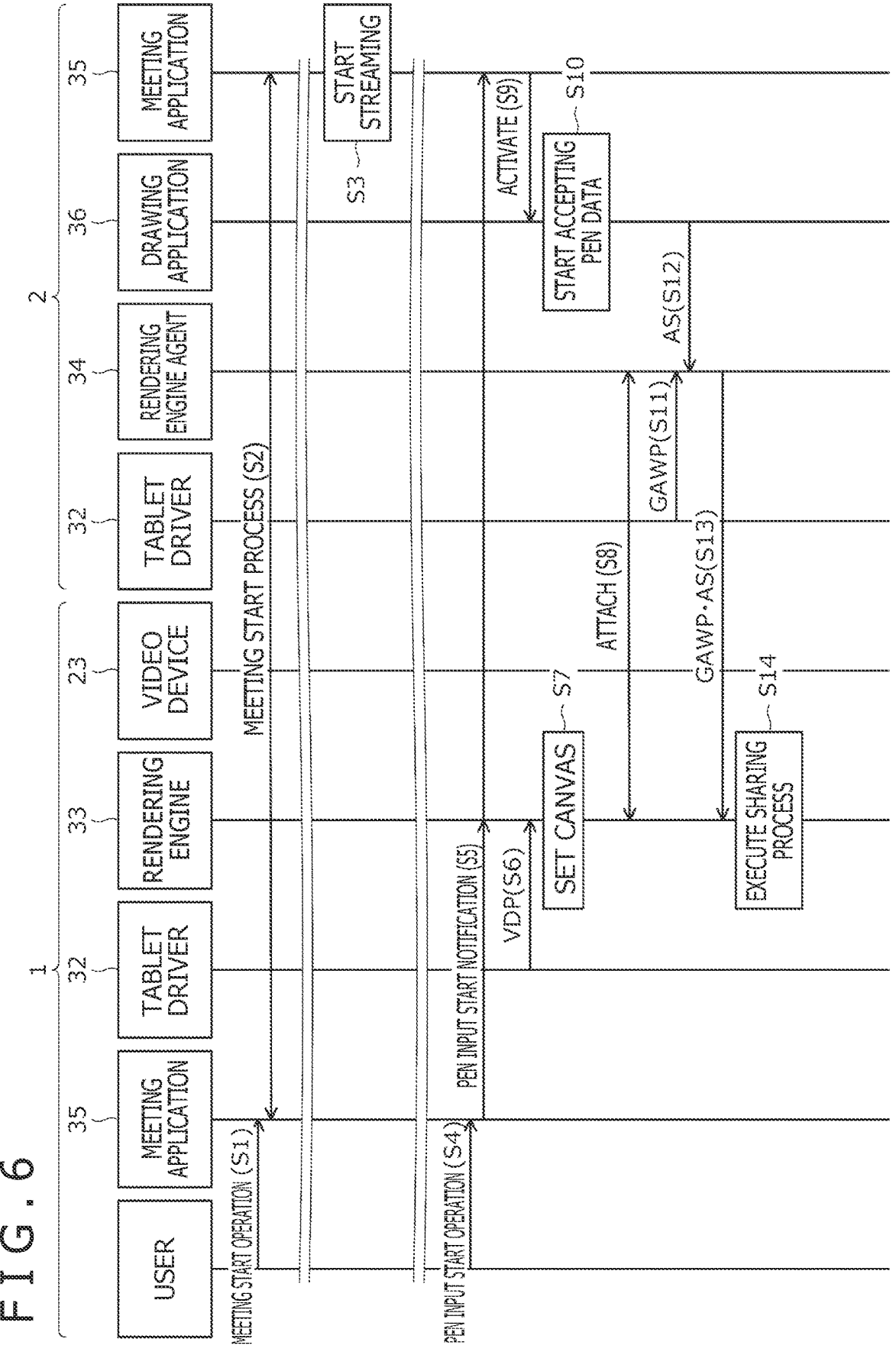
F I G . 6

F I G . 7
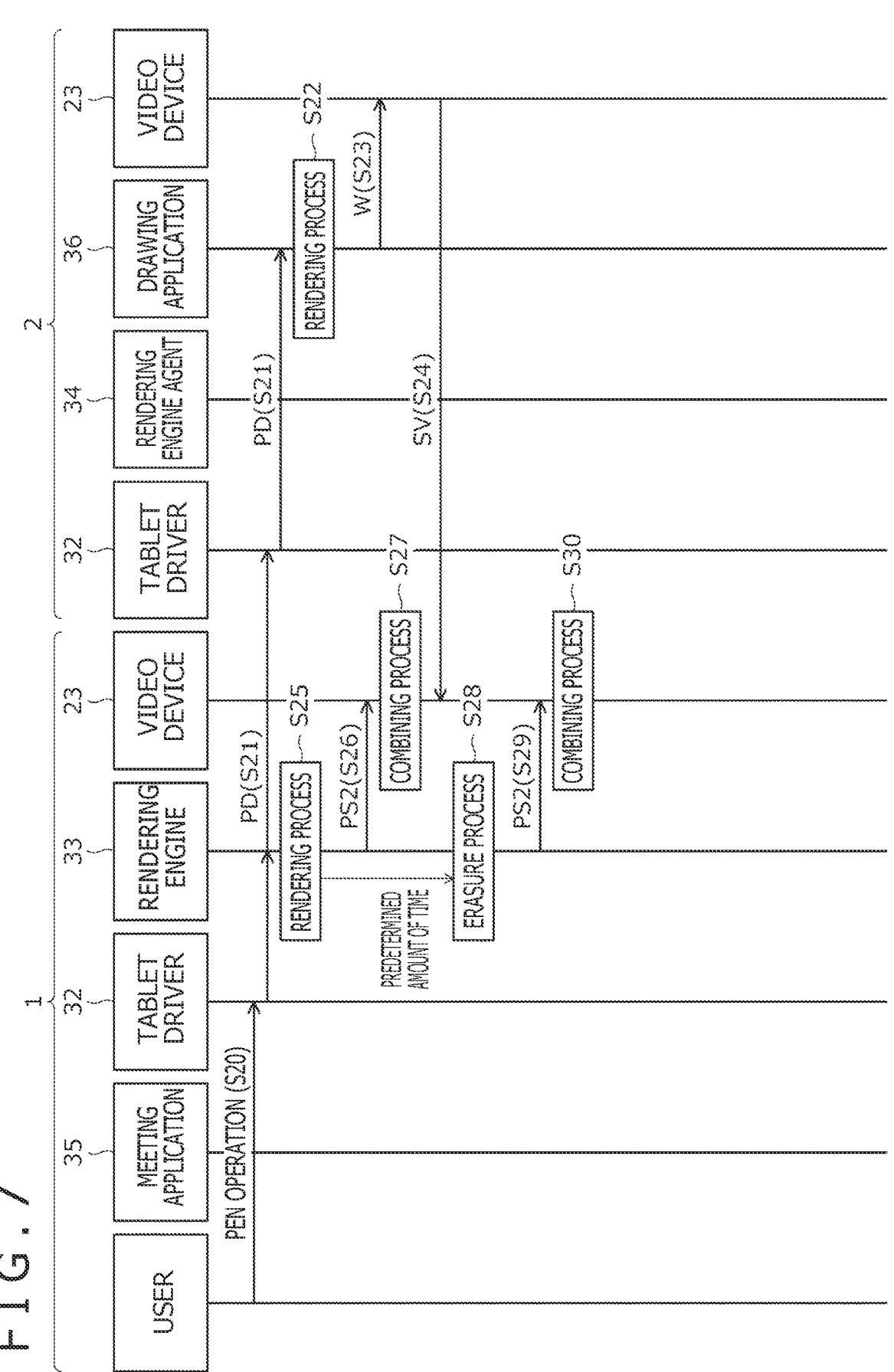

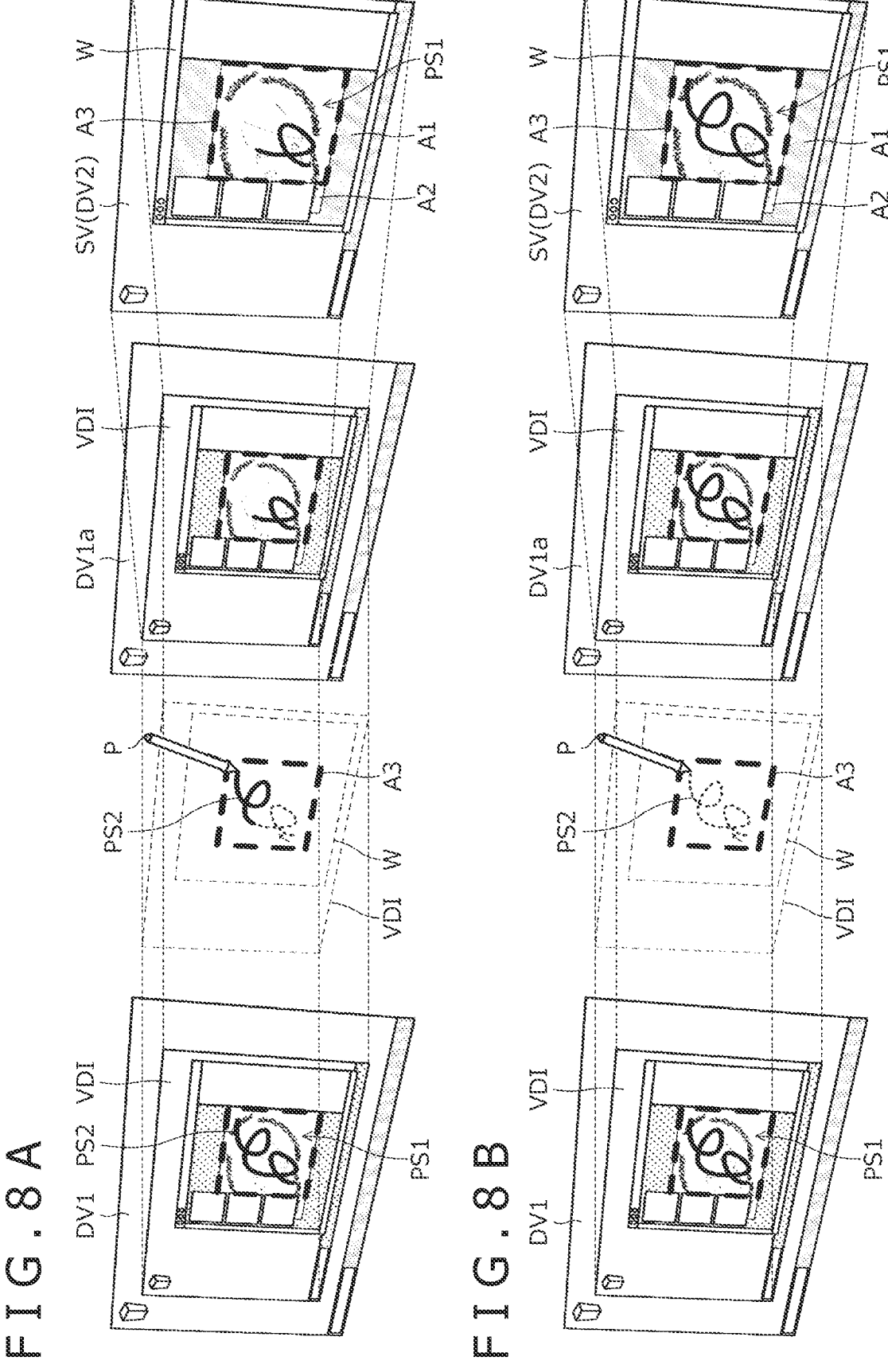
F I G . 8 A
F I G . 8 B

F I G . 1 2
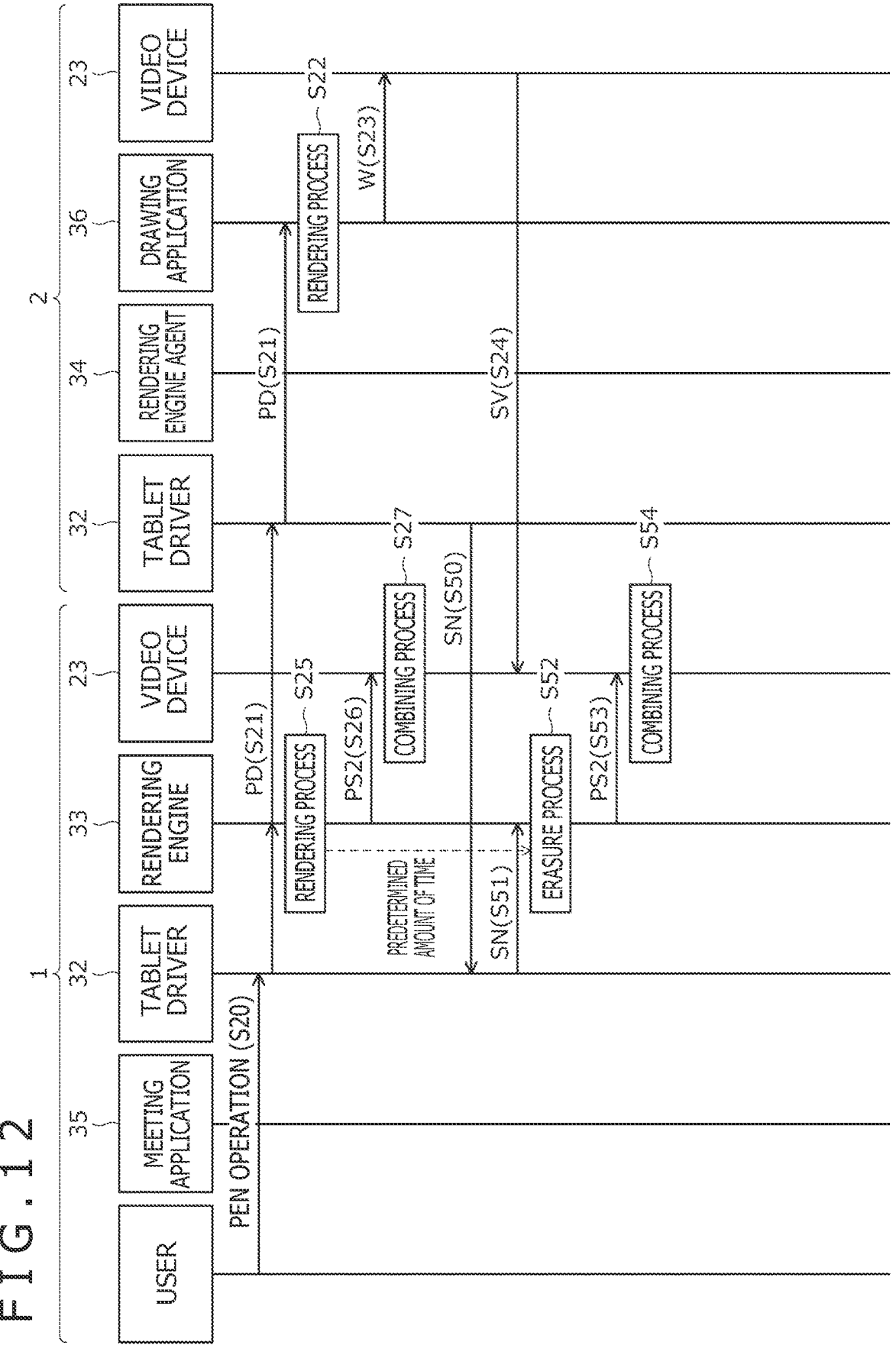

IMAGE DRAWING METHOD PERFORMED BY REMOTE-SIDE APPARATUS AND LOCAL-SIDE APPARATUS

BACKGROUND

Technical Field

The present disclosure pertains to an image drawing method, and particularly pertains to an image drawing method for performing pen input on a shared screen for a remote meeting.

Description of the Related Art

Recently, remote meetings, in which a plurality of computers are connected to each other using a communication line, are frequently used. In this type of remote meeting, "sharing" a screen open on one computer to enable the screen to be seen on another computer is widely performed. In this case, a streaming video for the shared screen is transmitted from a computer sharing the screen (hereinafter, referred to as a "remote-side apparatus") with another computer (hereinafter, referred to as a "local-side apparatus").

In addition, in a computer that supports pen input such as a tablet terminal, in order to reduce the impact on pen stroke drawing due to a processing delay for a host processor, there are cases of performing a process for, without going through a host processor, directly supplying a pen position to a display processor from a sensor controller that detects the pen position. Patent Documents 1 to 3 disclose examples of computers that perform this kind of processing. From among these, Patent Document 1 describes supplying a position from a sensor controller to both a host processor and a display processor and, in a duration until a pen stroke appears on an image generated by the host processor, the display processor temporarily draws the pen stroke.

In addition, there is a known technique that, when performing pen input, configures such that it is possible to set pen tip attributes such as the size, shape, and color of a pen tip. Patent Documents 4 and 5 disclose examples of such a technique.

PRIOR ART DOCUMENT

Patent Documents

Patent Document 1: U.S. Pat. No. 9,721,365
Patent Document 2: PCT Patent Publication No. WO2020/136729
Patent Document 3: U.S. Pat. No. 8,564,555
Patent Document 4: U.S. Published Application No. 2005-0162413
Patent Document 5: U.S. Pat. No. 9,792,517

BRIEF SUMMARY

Technical Problems

Incidentally, in a remote meeting as described above, there are cases of performing a pen input from a local-side apparatus with respect to a streaming video transmitted from a remote-side apparatus. In this case, the local-side apparatus only performs processing for sequentially transmitting a pen position detected by a sensor controller to the remote-side apparatus, and rendering of a pen stroke and compositing the pen stroke into the streaming video is executed by the remote-side apparatus. However, due to this processing, an amount of delay that cannot be ignored occurs until the pen stroke is reflected to the streaming video, and thus the inventors in the present application considered applying the techniques described in Patent Documents 1 through 3 to, in a duration until a pen stroke appears within a streaming video, temporarily draw the pen stroke in a local-side apparatus. A pen stroke image drawn by this temporary drawing process is referred to below as a "provisional image."

However, the techniques described in Patent Documents 1 to 3 presuppose a drawing process by a simple display processor, and do not correspond to an advanced drawing process that considers pen tip attributes as described in Patent Documents 4 and 5. Accordingly, there arises a case where appearances differ between a provisional image and a pen stroke image that finally appears within a streaming video, and improvement is required.

Accordingly, one objective of the present disclosure is to provide an image drawing method that can align appearances between a provisional image and a pen stroke image appearing in a streaming video.

In addition, a streaming video typically includes a region that is not appropriate as a region in which a pen stroke is drawn, such as a menu bar, for example. However, by the techniques described in Patent Documents 1 to 3, a local-side apparatus cannot discriminate a region (hereinafter, referred to as a "drawing region") that is within a streaming video and is suitable for drawing a pen stroke, and a provisional image may be drawn outside the drawing region due to movement of the pen by a user. Therefore, improvement is required.

Accordingly, one other objective of the present disclosure is to provide an image drawing method that can prevent a provisional image from being drawn outside a drawing region.

Technical Solution

An image processing method according to a first aspect of the present disclosure is performed by a remote-side apparatus and a local-side apparatus, the method includes transmitting, by the remote-side apparatus, a streaming video that includes an image generated by a first rendering process, generating, by the local-side apparatus, a provisional image by performing a second rendering process shared with the first rendering process in parallel with the first rendering process, receiving, by the local-side apparatus, the streaming video from the remote-side apparatus via communication that incurs a delay, compositing, by the local-side apparatus, the provisional image into the streaming video, and outputting, by the local-side apparatus, the streaming video.

An image processing method according to a second aspect of the present disclosure is performed by a remote-side apparatus and a local-side apparatus, the method includes transmitting, by the remote-side apparatus, a streaming video, transmitting, by the remote-side apparatus, drawing region information indicating a drawing region within the streaming video, receiving, by the local-side apparatus, the drawing region information from the remote-side apparatus, generating, by the local-side apparatus, a provisional image provisionally displayed within the streaming video, compositing, by the local-side apparatus, the provisional image into a region of the streaming video that is indicated by the drawing region information, and outputting, by the local-side apparatus, the region.

Advantageous Effects

By virtue of the first aspect of the present disclosure, because the second rendering process performed by the local-side apparatus is shared with the first rendering process executed by the remote-side apparatus, the local-side apparatus can use an advanced drawing process that considers pen tip attributes to draw the provisional image.

By virtue of the second aspect of the present disclosure, because a region for compositing the provisional image can be restricted to a region indicated by the drawing region information, it is possible to restrict drawing of the provisional image outside the drawing region.

BRIEF DESCRIPTION OF THE SEVERAL VIEWS OF THE DRAWINGS

FIG. 1 is a view that illustrates a system configuration of computers that perform an image processing method according to a first embodiment of the present disclosure.

FIG. 2A is a view that illustrates an example of a streaming video and desktop videos, and FIG. 2B is a view that illustrates an example of the streaming video and the desktop videos while a user is performing a pen input.

FIG. 3 is a view that indicates a format of data required by a drawing application in order to perform a rendering process.

FIG. 4A is a view that illustrates a format for application state information, and FIG. 4B is a view that illustrates a format for drawing application window position information.

FIG. 6 is a view that illustrates a sequence for an image processing method according to a first embodiment of the present disclosure.

FIG. 7 is a view that illustrates a sequence for the image processing method according to the first embodiment of the present disclosure.

FIGS. 8A and 8B are each a view that illustrates an example of the streaming video and the desktop videos while a user is performing a pen input.

FIG. 12 is a view that illustrates a sequence for describing an image processing method according to a third embodiment of the present disclosure.

FIG. 13 is a view that illustrates a system configuration of a computer that performs an image processing method according to a fourth embodiment of the present disclosure.

FIG. 14 is a view that illustrates a system configuration of computers that perform an image processing method according to a fifth embodiment of the present disclosure.

MODES FOR CARRYING OUT THE INVENTION

Figure 5:
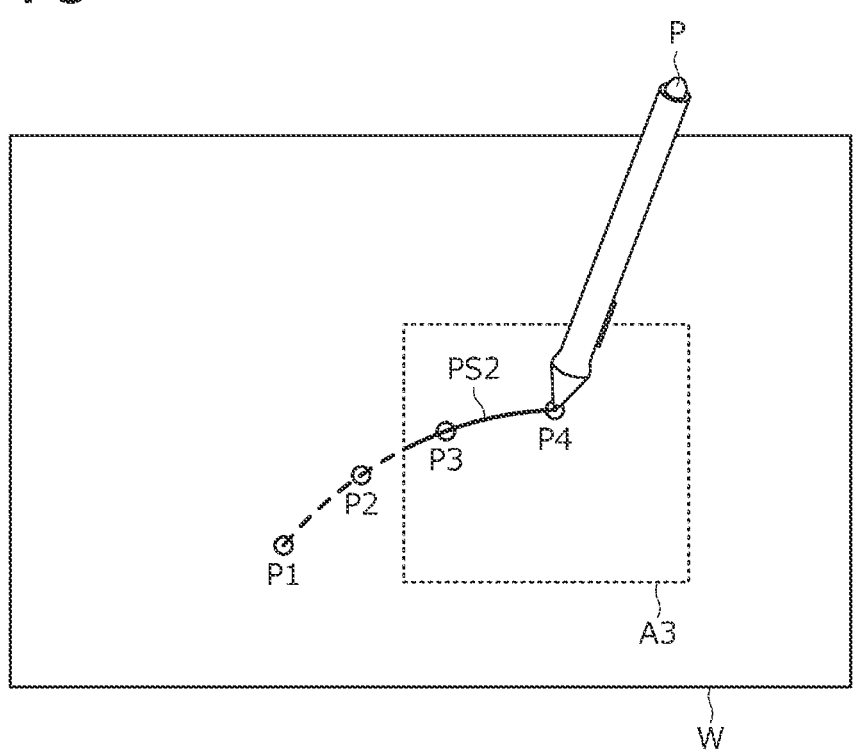
FIG. 5 is a view that illustrates an example of drawing a pen stroke image inside a drawing region.

With reference to the attached drawings, description is given in detail below regarding embodiments of the present disclosure.

Figure 1:
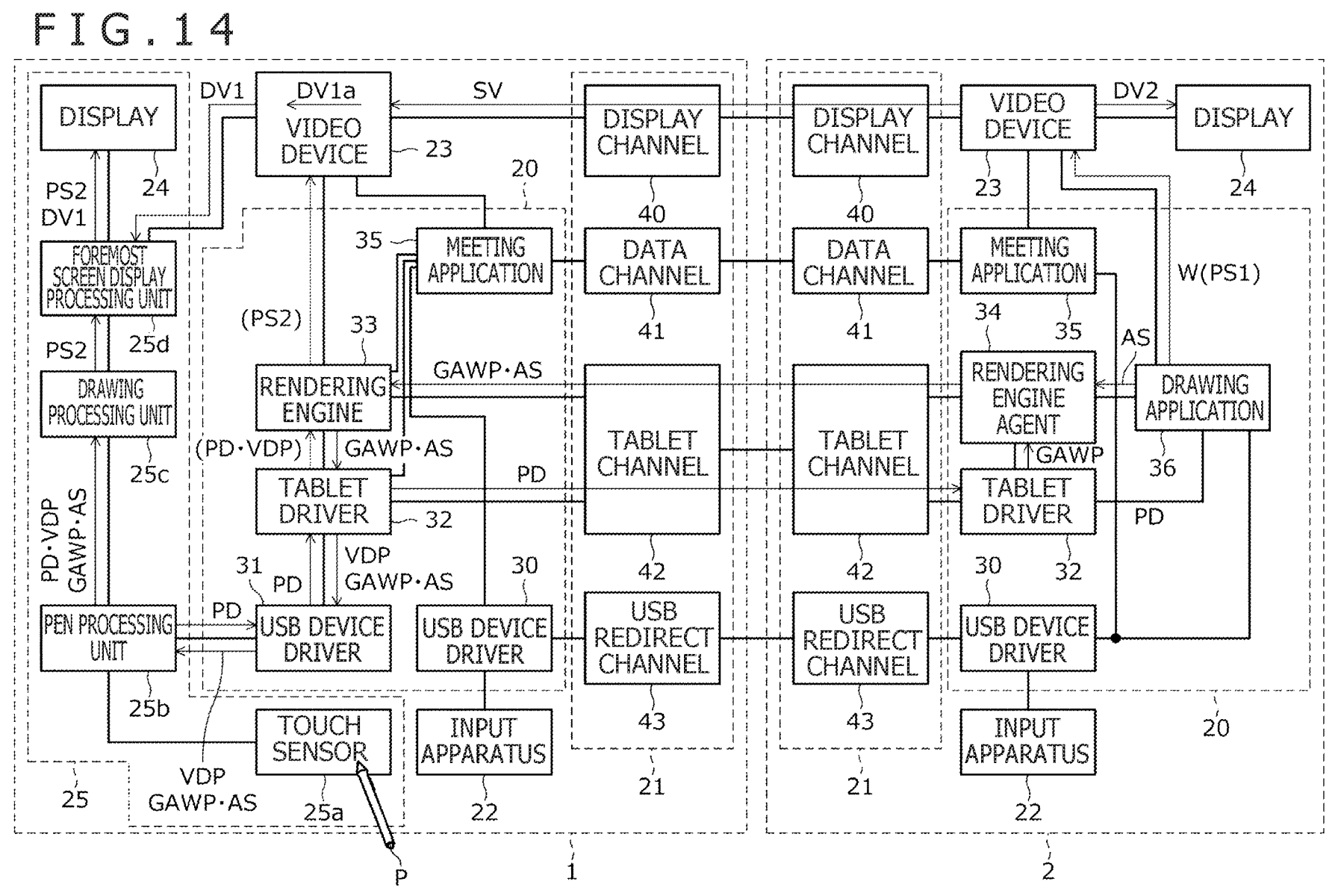

FIG. 1 is a view that illustrates a system configuration of computers 1 and 2 that execute an image processing method according to a first embodiment of the present disclosure. Each of the computers 1 and 2 is an information processing apparatus used for personal use, such as a personal computer, a tablet terminal, or a smartphone, for example. A predetermined meeting application is installed on each of the computers 1 and 2, and the computers 1 and 2 perform a remote meeting with each other through this meeting application. The type of the meeting application is not particularly limited, but, in the present embodiment, what has a function for sharing a screen (a desktop screen or an application window) for one computer (a remote-side apparatus) with another computer (a local-side apparatus) is used.

In the present embodiment, it is assumed that the computer 1 is the local-side apparatus and the computer 2 is the remote-side apparatus. When a user of the computer 2 which is the remote-side apparatus performs a predetermined operation for sharing their own desktop screen, the desktop screen for the computer 2 is displayed within the desktop screen of the computer 1 which is the local-side apparatus. Below, a video that configures the desktop screen for the computer 1 is referred to as a desktop video DV1, and a video that configures the desktop screen for the computer 2 is referred to as a desktop video DV2. A region for disposing the desktop video DV2 within the desktop video DV1 is referred to as a virtual desktop region VDI (refer to FIGS. 2A and 2B described below).

The computer 1 has a function for accepting a pen input by a pen P with respect to the virtual desktop region VDI within its own desktop screen. Specifically, configuration is made to enable to execution of a process for detecting an indication position for a pen P within the virtual desktop region VDI, a process for receiving data such as a pen pressure value from the pen P, and a process for supplying pen data PD, which includes the detected indication position and the received data, to the computer 2. The computer 2, having been supplied with the pen data PD, performs a process to generate a pen stroke image PS1 on the basis of the supplied pen data PD and display the pen stroke image PS1 within the desktop video DV2. Because the desktop video DV2 is being displayed within the virtual desktop region VDI, by this series of processes, a pen stroke inputted using the pen P is displayed within the desktop screen for each of the computers 1 and 2.

From among configurations respectively held by the computers 1 and 2, FIG. 1 illustrates those relating to each process above. With reference to FIG. 1, description is given in detail below regarding configurations and operation for the computers 1 and 2.

Each of the computers 1 and 2 includes a processor 20, a communication apparatus 21, an input apparatus 22, a video device 23, and a display 24. The computer 1 further includes a pen input apparatus 25.

A processor 20 is a central processing unit for each of the computers 1 and 2, and is configured to, from a memory that is not illustrated, read out and execute programs that configure an operating system, various device drivers, and various applications. Each unit illustrated within a processor 20 in FIG. 1 indicates a functional unit realized by the processor 20 executing a corresponding program.

To give a description in detail, functional units realized by the processor 20 in the computer 1 include a USB (Universal Serial Bus) device driver 30 which is a device driver for the input apparatus 22, a USB device driver 31 which is a device driver for the pen input apparatus 25, a tablet driver 32 for controlling the pen input apparatus 25 via the USB device driver 31, a rendering engine 33 for drawing a pen stroke image PS2 on the basis of information supplied from the tablet driver 32, and a meeting application 35 for realizing a remote meeting with another computer. In addition, functional units realized by the processor 20 in the computer 2 include a USB device driver 30, a tablet driver 32, and a meeting application 35, as well as a rendering engine agent 34 that functions as an agent for the rendering engine 33 within the computer 2, and a drawing application 36 that draws a pen stroke image PS1 on the basis of information supplied from the tablet driver 32. Details of operations by each functional unit are described below.

The communication apparatus 21 has a function for communicating with another computer via the internet or an ad-hoc network. This communication is performed in accordance with the OSI (Open Systems Interconnection) reference model, and thus a display channel 40, a data channel 41, a tablet channel 42, and a USB redirect channel 43 that are illustrated respectively indicate channels set in a transport layer.

The input apparatus 22 is a mouse or a keyboard, for example. The USB device driver 30 is configured to be able to sequentially obtain operation information indicating a result of an operation with respect to the input apparatus 22 by a user, supply the operation information to each functional unit within the processor 20, and also supply the operation information to a USB device driver 30 in another computer via the USB redirect channel 43. The USB device driver 30, having obtained operation information from another computer, performs processing to supply the operation information from the other computer to each functional unit within the processor 20, similarly to operation information obtained from the input apparatus 22 directly connected to itself.

The pen input apparatus 25 is an apparatus that accepts a pen input using a pen P. In a typical example, the pen P is a rod-shaped indicator having a function for indicating a position in a plane and, in this case, the pen input apparatus 25 includes a touch sensor, which has a touch surface, and a sensor controller. The touch sensor includes a plurality of sensor electrodes disposed on the touch surface. The sensor controller is configured to use the touch sensor to detect two-dimensional coordinates indicating the indication position for the pen P, and to receive data such as a pen pressure value from the pen P. A method of detecting the position of the pen P using the sensor controller is not particularly limited, but using an active capacitive method or an electromagnetic induction method is suitable. The pen P may be a controller for performing a three-dimensional input in an XR (Extended Reality) space and, in this case, the pen input apparatus 25 is configured to detect three-dimensional coordinates indicating an indication position for the pen P in the XR space, and to receive data such as a pen pressure value from the pen P.

The pen input apparatus 25 is configured to, each time the pen input apparatus 25 detects an indication position for the pen P, supply the detected indication position for the pen P and the data received from the pen P to the tablet driver 32 via the USB device driver 31. The tablet driver 32 is configured to generate pen data PD that includes the indication position and data supplied from the pen input apparatus 25, sequentially supply the pen data PD to the rendering engine 33, and sequentially supply the pen data PD to the tablet driver 32 in another computer via the tablet channel 42.

The tablet driver 32 is also configured to, from a desktop video for the computer on which the tablet driver 32 itself is operating, obtain information pertaining to a portion corresponding to an input by the pen input apparatus 25. To give a description in detail, the tablet driver 32 in the computer 1 performs processing for obtaining, from the meeting application 35 or the operating system, virtual desktop information VDP indicating a position and size for the virtual desktop region VDI within the desktop video DV1, and supplying the virtual desktop information VDP to the rendering engine 33. In addition, the tablet driver 32 in the computer 2 performs processing for obtaining drawing application window position information GAWP indicating, inter alia, a position and size of a window W for the drawing application 36 within the desktop video DV2, and supplying the drawing application window position information GAWP to the rendering engine agent 34. Description is separately given in detail below regarding the drawing application window position information GAWP.

The video device 23 is an apparatus that generates a desktop video to be displayed to a desktop in accordance with control by the processor 20 and supplies the desktop video to the display 24. The display 24 fulfills a role for displaying the desktop video which is supplied in this manner. In the example in FIG. 1, the video device 23 in the computer 1 generates the desktop video DV1, and the video device 23 in the computer 2 generates the desktop video DV2. Description is given in detail below, but the video device 23 in the computer 1 is configured to first generate a desktop video DV1a that includes a streaming video SV transmitted from the computer 2, and composite the pen stroke image PS2 supplied from the rendering engine 33 into the generated desktop video DV1a to thereby generate the desktop video DV1.

In accordance with control by the meeting application 35, the video device 23 performs processing for performing a streaming transmission of a portion or all of the desktop video that the video device 23 itself generated to another computer through the display channel 40. The streaming video SV, which is illustrated in FIG. 1, represents a video transmitted in this manner by the video device 23 in the computer 2.

FIG. 2A is a view that illustrates an example of the streaming video SV and the desktop videos DV1 and DV1a. The same figure illustrates a case in which the streaming video SV includes the entirety of the desktop video DV2, and the rendering engine 33 is not supplying the pen stroke image PS2. In this case, the streaming video SV and the desktop video DV2 are the same, and the desktop video DV1 and the desktop video DV1a are the same.

The window W illustrated within the streaming video SV is generated by the drawing application 36, and is disposed within the desktop video DV2. There are cases where various windows or icons are included within the desktop video DV2, as in this example. In a case where a streaming target is the entirety of the desktop video DV2, these windows or icons will also be included in the streaming video SV. In contrast, in a case where a sharing target is only a specific window being displayed within the desktop video DV2, the streaming video SV includes only an image for the window that is set as the sharing target.

The streaming video SV is disposed within the virtual desktop region VDI provided for the desktop video DV1a.

The video device 23 in the computer 1 is configured to dispose the virtual desktop region VDI within the desktop video DV1a in response to control by the meeting application 35, and dispose the streaming video SV therein. As a result, because a portion or the entirety of the desktop video DV2 from the computer 2 is displayed by the display 24 belonging to the computer 1 as indicated by the desktop video DV1 in FIG. 2A, users of the computers 1 and 2 can carry out a remote meeting while viewing the same screen.

With reference to FIG. 1, the meeting application 35 is a functional unit that has a function of communicating with a meeting application 35 in another computer via the data channel 41 to thereby establish a remote meeting between a plurality of computers. The meeting application 35 in the computer 2 also performs processing for controlling the video device 23 such that a portion or the entirety of the desktop video DV2 is transmitted to the computer 1 as the streaming video SV. In addition, the meeting application 35 in the computer 1 also performs processing for controlling the video device 23 such that the virtual desktop region VDI is disposed within the desktop video DV1 and the streaming video SV supplied from the computer 2 is disposed therein.

The drawing application 36 is a functional unit that performs a rendering process based on the pen data PD supplied from the tablet driver 32 to thereby generate the pen stroke image PS1. The drawing application 36 is configured to generate the window W illustrated in FIG. 2A and dispose the generated pen stroke image PS1 therein. The window W that includes the pen stroke image PS1 is disposed within the desktop video DV2 by the video device 23.

To give a description regarding the internal structure of the window W, as illustrated in FIG. 2A, the window W includes a main area A1, a campus area A2, and other regions (header, footer, toolbar, various properties panels, etc.). The main area A1 is a region for displaying the campus area A2. The campus area A2 is configured such that it is possible to perform various operations such as expansion/reduction, rotation, and movement within the main area A1, in accordance with a user operation. The campus area A2 is a region (drawing region) for accepting drawing in accordance with the pen P. The drawing application 36 is configured to, in a case where the generated pen stroke image PS1 includes a portion positioned outside the campus area A2, not perform drawing for this portion. Accordingly, the pen stroke image PS1 is disposed only inside the campus area A2.

The window W disposed within the desktop video DV2 and the pen stroke image PS1 included therein are displayed by the display 24 belonging to the computer 1 as the entirety or a portion of the streaming video SV. However, in a stage until a result for a pen input using the pen P is reflected to the desktop video DV1, various delays occur, such as network delay due to communication between the computers 1 and 2, and an image compression encoding delay and buffering delay that occur in processing inside the computers 1 and 2. As a result, there are cases where deviation to a degree that cannot be ignored occurs between the pen tip of the pen P and the front end of the pen stroke image PS1 displayed on the display 24 belonging to the computer 1. One objective of an image processing method according to the present embodiment is to reduce this deviation.

FIG. 3 is a view that indicates a format of various pieces of data related to a rendering process performed by the drawing application 36. As illustrated in the same figure, the various types of data include pen data, historical data, and brush data. The drawing application 36 draws the pen stroke image PS1 on the basis of these pieces of data.

The pen data is the pen data PD supplied from the tablet driver 32. As illustrated in FIG. 3, the pen data PD can include cursor information, button information, coordinate data, pen pressure value information, airbrush wheel information, inclination information, and rotation information. The pen data PD may include serial information indicating its own order within a series of pieces of pen data PD.

The cursor information indicates whether or not a target for an operation using the pen P is a cursor and, if not a cursor (in other words, in a case where the pen P is being operated in order to draw a pen stroke), indicates whether or not a switch (for example, a tail switch disposed at the end of the pen P) provided on the pen P is being pressed. In a typical example, the cursor information is 0 in a case where a target for an operation using the pen P is a cursor, is 1 in a case where the target for the operation using the pen P is not a cursor and a switch is not being pressed, and is 2 in a case where the target for the operation using the pen P is not a cursor and a switch is being pressed. In a case where the cursor information indicates that a target of an operation using the pen P is a cursor, the drawing application 36 does not generate the pen stroke image PS1.

The button information indicates an on-off state for other switches provided on the pen P. The coordinate data is two-dimensional or three-dimensional coordinates indicating the position of the pen P detected using the sensor controller in the pen input apparatus 25. The pen pressure value information indicates a pen pressure value (a value for pressure imparted to the tip of the pen P) detected using a pressure sensor provided in the pen P. The pen pressure value is a value greater than 0 in a case where the pen tip of the pen P is in contact with a touch surface (a case of being pen-down), and is 0 in a case where the pen tip of the pen P is not in contact with a touch surface (a case of hovering). In a case where the pen P is of an airbrush type, the airbrush wheel information indicates a force applied to a wheel provided on the surface of the pen P. The inclination information indicates the inclination of the pen P with respect to a touch surface. The rotation information indicates an amount of rotation by the pen P in a pen shaft direction.

The historical data is a history of the pen data PD. The drawing application 36 is configured to store pen data PD for a certain amount of time as historical data. The drawing application 36 derives a curve, such as a Bezier curve or a Catmull-Rom spline, on the basis of a series of coordinates included in each of the pen data PD and the historical data, and controls attributes (line width, degree of transparency, color, etc.) for the curve on the basis of other data, which is included in each of the pen data PD and the historical data, and later-described brush data to thereby generate the pen stroke image PS1. In addition, in a case of being necessary when calculating a later-described function, the drawing application 36 also derives a writing speed on the basis of a series of coordinates respectively included in the pen data PD and the historical data.

The brush data indicates pen tip attributes for the pen P and is set by the drawing application 36 in accordance with a user. To describe in detail, the brush data includes function information, color information, size information, pen tip shape information, brush selection cancellation information, a pattern bitmap, coarseness/fineness data, a coarseness/fineness randomness, a coarseness/fineness random number seed, orientation data, an orientation randomness, and an orientation random number seed.

The function information indicates a function for deriving pen stroke attributes (line width, degree of transparency, shading, coarseness/fineness, etc.) on the basis of information pertaining to the pen P, such as the pen pressure value, the inclination, and the writing speed. In a typical example, the function information indicates a function that prescribes a relation between the pen pressure value and the line width. In addition, the function information may indicate a function that prescribes a relation between a combination of pen pressure value and writing speed and the line width, may indicate a function that prescribes a relation between a combination of pen P inclination and writing speed and shading, or may indicate a plurality of functions including these. In addition, the color information specifies a drawing color (including a degree of transparency) for a pen stroke image. The size information specifies a reference value (reference value for a line width change accompanying a pen pressure value change) for the line width of a pen stroke. The size information may include a function (for example, a function for increasing the line width as the stay time for the pen P becomes longer at the same position to thereby reproduce a situation where ink spreads) that indicates a relation between the stay time of the pen P at the same position and the line width. The pen tip shape information specifies a type of shape for the pen tip, such as a ballpoint pen type or a color marker type. Control of curve attributes (line width, degree of transparency, color, etc.) by the drawing application 36 is executed on the basis of these pieces of information.

The brush selection cancellation information indicates whether a tool that does not need a pen stroke to be drawn, such as region selection or fill, is selected. In a case where the brush selection cancellation information indicates that a tool that does not need a pen stroke to be drawn is selected, the drawing application 36 does not generate the pen stroke image PS1.

The pattern bitmap, coarseness/fineness data, coarseness/fineness randomness, coarseness/fineness random number seed, orientation data, orientation randomness, and orientation random number seed, are pieces of information that are referred to when the drawing application 36 uses particle scattering to generate the pen stroke image PS1. To give a description in detail, the pattern bitmap is image data indicating each part of a curve in accordance with particle scattering. The coarseness/fineness data indicates a reference value for a disposition density for the pattern bitmap, and the orientation data indicates a reference value for an orientation for the disposition of the pattern bitmap. The drawing application 36 is configured to dispose the pattern bitmap along a curve derive on the basis of the coordinate data at a randomly determined disposition density centered on the disposition density indicated by the coarseness/fineness data and at a randomly determined disposition orientation centered on the disposition orientation indicated by the orientation data, to thereby generate the pen stroke image PS1 in accordance with particle scattering.

The coarseness/fineness randomness, coarseness/fineness random number seed, orientation randomness, and orientation random number seed are each a value that is set by a random number generator in order to generate random numbers. A randomness indicates a degree of deviation between a pseudo-random number sequence generated by the random number generator and an ideal random number sequence, and a random number seed indicates an initial value set to a random number generator. The drawing application 36 is configured to determine a pattern bitmap disposition density on the basis of a pseudo-random number obtained by setting the coarseness/fineness randomness and coarseness/fineness random number seed to a random number generator, and determine an orientation for the disposition of the pattern bitmap on the basis of a pseudo-random number obtained by setting the orientation randomness and orientation random number seed to the random number generator.

With reference to FIG. 1, the drawing application 36 also performs processing to generate application state information AS, which characterizes rendering process that the drawing application 36 itself performs and supply the application state information AS to the rendering engine agent 34.

FIG. 4A is a view that indicates a format for the application state information AS. As illustrated in the same figure, the application state information AS includes drawing setting information and campus area information.

The drawing setting information is information that specifies the appearance of a pen stroke drawn by a rendering process, and includes brush data and brush parameter change information. The brush data is the brush data indicated in FIG. 3. The brush parameter change information specifies what has changed from previous application state information AS, from among the brush data.

The campus area information is information pertaining to the campus area A2 (region that accepts drawing using the pen P) in the window W illustrated in FIG. 2A, and includes initial state information, magnification/reduction information, rotation information, movement information, and drawing region information. The initial state information indicates initial values for the position and size of the campus area A2 within the window W. The magnification/reduction information indicates a magnification factor for display of the campus area A2, from the initial size indicated by the initial state information. The rotation information indicates a rotation angle for the campus area A2. The movement information indicates an amount of movement for the campus area A2 from the initial position indicated by the initial state information. The drawing region information indicates a position, size, shape, and background color for the drawing region A3 illustrated in FIG. 2A, within the campus area A2.

With reference to FIG. 1, the rendering engine agent 34 is a functional unit that functions as an agent for the rendering engine 33, and is attached to the rendering engine 33 when the rendering engine 33 starts drawing the pen stroke image PS2. The rendering engine agent 34 is configured to obtain the drawing application window position information GAWP from the tablet driver 32, obtain the application state information AS from the drawing application 36, and supply these obtained pieces of information to the rendering engine 33 via the tablet channel 42.

FIG. 4B is a view that indicates a format for the drawing application window position information GAWP. As illustrated in the same figure, the drawing application window position information GAWP includes position information, size information, active information, inactive information, menu open/closed information, and child window deployment information.

The position information indicates the position of the window W within the desktop video DV2, and the size information indicates the size of the window W. The active information is true in a case where the window W is in the foreground and is false otherwise, and the inactive information is true in a case where the window W is in the background and is false otherwise. In a case where the active information is false and the inactive information is true, the drawing application 36 has entered a state in which a pen input is not accepted (state of not generating the pen stroke image PS1).

The menu open/closed information is true in a case of having entered a state in which one menu provided within the window W is open, and is false otherwise. The child window deployment information is true in a case where a child window (such as a folder selection screen for a time of saving a file or a setting screen) is open within the window W, and is false otherwise. In a case where the menu open/closed information is true and in a case where the child window deployment information is true, the drawing application 36 has entered a state in which a pen input is not accepted (state of not generating the pen stroke image PS1).

With reference to FIG. 1, the rendering engine 33 is a functional unit that generates a pen stroke image PS2 (a provisional image) by executing a rendering process (hereinafter, referred to as a "second rendering process"), which is shared with a rendering process (hereinafter, referred to as a "first rendering process") performed by the drawing application 36, the executing being in parallel with the first rendering process. Sharing of the first rendering process and the second rendering process means essentially aligning the appearance of the pen stroke image PS2 with the appearance of the pen stroke image PS1, and includes sharing of the drawing application window position information GAWP and the application state information AS between the computers 1 and 2.

To give a description is more detail, the rendering engine 33, on the basis of the virtual desktop information VDP supplied from the tablet driver 32, obtains the position and size of the virtual desktop region VDI within the desktop video DV1. Next, the rendering engine 33, on the basis of the drawing application window position information GAWP received from the rendering engine agent 34, obtains the position and size of the window W within the virtual desktop region VDI. The rendering engine 33 further, on the basis of campus area information within the application state information AS received from the rendering engine agent 34, obtains the position, size, shape, and background color for the drawing region A3 within the window W. The rendering engine 33 is configured to draw the pen stroke image PS2 only inside the drawing region A3, which is obtained in this manner. As a result, the pen stroke image PS2 is drawn at the same position as the pen stroke image PS1, which is displayed later.

FIG. 5 is a view that illustrates an example of drawing the pen stroke image PS2 inside the drawing region A3. The tablet driver 32 is configured to generate the pen data PD and supply the pen data PD to the rendering engine 33, even in a case where an indication position for the pen P is outside the drawing region A3. Positions P1 through P4 indicated in FIG. 5 represent indication positions for the pen P that are included in a series of pen data PD supplied from the tablet driver 32 to the rendering engine 33 and, from among these, the positions P1 and P2 are outside the drawing region A3. The rendering engine 33 draws the pen stroke image PS2 while, if necessary, referring to positions outside the drawing region A3 as with the positions P1 and P2. In other words, four positions are necessary when deriving an above-described Catmull-Rom spline, for example. Accordingly, the rendering engine 33 refers to four positions including positions outside the drawing region A3 in order to derive a curve and only draws a portion thereof that is within the drawing region A3, to thereby draw the pen stroke image PS2.

With reference to FIG. 1, the rendering engine 33, on the basis of the drawing setting information within the application state information AS received from the rendering engine agent 34, obtains brush data to be used in the first rendering process. The obtained brush data is used to perform the second rendering process on the basis of the pen data PD supplied from the tablet driver 32, whereby the pen stroke image PS2 is generated. As a result, the pen stroke image PS2 has the same appearance as the pen stroke image PS1.

In addition, the rendering engine 33, on the basis of the drawing application window position information GAWP and the application state information AS received from the rendering engine agent 34, determines whether or not the drawing application 36 is generating the pen stroke image PS1. The second rendering process is performed to thereby generate the pen stroke image PS2 only in a case of determining that the drawing application 36 is generating the pen stroke image PS1. As a result, it is possible to prevent the occurrence of a situation in which the pen stroke image PS2 is generated despite the pen stroke image PS1 not being generated.

FIG. 2B is a view that illustrates an example of the streaming video SV and the desktop videos DV1 and DV1a while a user is performing a pen input. The same figure also illustrates the pen stroke image PS2 generated by the rendering engine 33. As illustrated in the same figure, the rendering engine 33 is configured to virtually set the virtual desktop region VDI, the window W, and the drawing region A3, and, from among these, draw the pen stroke image PS2 only within the drawing region A3.

With reference to FIG. 1, the rendering engine 33 also performs processing for supplying the generated pen stroke image PS2 to the video device 23. The video device 23 composites the pen stroke image PS2 with the desktop video DV1a, which is internally generated, to thereby generate the desktop video DV1a, and supplies the desktop video DV1a to the display 24. As a result, the desktop video DV1, which includes the pen stroke image PS2, is displayed by the display 24 as illustrated in FIG. 2B. Accordingly, at a stage before the display of the pen stroke image PS1, which tends to suffer from display lag, a user of the computer 1 can see the pen stroke image PS2, which has the same appearance as that of the pen stroke image PS1, at the same position as that of the pen stroke image PS1.

FIG. 6 and FIG. 7 are views that illustrate a sequence for an image processing method according to the present embodiment. With reference to FIG. 6 and FIG. 7, description is given below again in further detail regarding processing performed by the computers 1 and 2.

Firstly, referring to FIG. 6, a user initially performs an operation on the meeting application 35 for starting a remote meeting (S1). This operation can be performed using the input apparatus 22 or the pen input apparatus 25. This point also applies for each operation described below. Note that FIG. 6 only illustrates an operation performed by the user of the computer 1, but an operation for starting a meeting is performed in each of the computers 1 and 2.

Upon the operation at S1 being performed, the meeting applications 35 in the computers 1 and 2 execute processing for starting a remote meeting, through the data channel 41 illustrated in FIG. 1 (S2). As a result, a remote meeting is started between the computers 1 and 2.

In response to an operation by the user of the computer 2, the meeting application 35 in the computer 2, which has started the remote meeting, starts streaming the entirety or a portion of the desktop video DV2 illustrated in FIG. 1 (S3). As a result, transmission of the streaming video SV, which includes the entirety or a portion of the desktop video DV2 is started via the display channel 40 illustrated in FIG. 1, and the streaming video SV received from the computer 2 appears within the desktop video DV1 displayed on the display 24 belonging to the computer 1.

Next, the user of the computer 1 performs an operation for starting a pen input using the pen P on the meeting application 35 (S4). After receiving this operation, the meeting application 35 makes a notification of the start of the pen input to the rendering engine 33 and the meeting application 35 in the computer 2 (S5).

After receiving the notification at S5, the rendering engine 33 obtains the above-described virtual desktop information VDP from the tablet driver 32 (S6), and sets a campus for drawing a stroke at a position that is for the virtual desktop region VDI and is indicated thereby (S7). In addition, the rendering engine 33 also attaches to the rendering engine agent 34 within the computer 2, through the tablet channel 42 illustrated in FIG. 1 (S8).

In addition, the meeting application 35 in the computer 2, which has received the notification at S5, activates the drawing application 36 (S9). The drawing application 36 activated as a result starts accepting pen data PD from the tablet driver 32 (S10).

The rendering engine agent 34 attached to the rendering engine 33 at S8 obtains the drawing application window position information GAWP from the tablet driver 32 (S11), obtains the application state information AS from the drawing application 36 (S12), and transmits these obtained pieces of information to the rendering engine 33 through the tablet channel 42 illustrated in FIG. 1 (S13).

After receiving the drawing application window position information GAWP and the application state information AS from the rendering engine agent 34, the rendering engine 33 executes a sharing process for sharing the first rendering process executed by the drawing application 36 (S14). To give a description in detail, the rendering engine 33, on the basis of the drawing application window position information GAWP, obtains the position and size of the window W that are within the campus set at S7, and also obtains the position, size, shape, and background color of the drawing region A3 within the window W on the basis of the campus area information within the application state information AS. In addition, on the basis of the drawing setting information within the application state information AS, the rendering engine 33 obtains brush data to be used in the first rendering process and, on the basis of the drawing application window position information GAWP and the application state information AS, confirms that the drawing application 36 is generating the pen stroke image PS1. The rendering engine 33 can execute this sharing process to thereby draw the pen stroke image PS2, which has the same appearance as that of the pen stroke image PS1, within the drawing region A3.

Here, it is desirable for the rendering engine agent 34 to at least periodically execute obtainment of the drawing application window position information GAWP and the application state information AS, and transmission of the drawing application window position information GAWP and the application state information AS to the rendering engine 33. Alternatively, the rendering engine agent 34 may monitor for a change to the drawing application window position information GAWP and the application state information AS, each time the drawing application window position information GAWP and application state information AS are changed, and may execute obtainment and transmission thereof to the rendering engine 33. To give an example, the rendering engine agent 34 may transmit the drawing application window position information GAWP in response to a drawing application 55 being the foreground and the active information within the drawing application window position information GAWP having been changed as a result.

In addition, in the rendering engine 33, it may be determined whether or not the pen stroke image PS2 generated by the rendering engine 33 is different from the pen stroke image PS1 which is subsequently received and, if determined to be different, a request for the drawing application window position information GAWP and the application state information AS may be made from the rendering engine 33 to the rendering engine agent 34, and the rendering engine agent 34 may transmit the drawing application window position information GAWP and the application state information AS to the rendering engine 33 in response to this request. Accordingly, it is possible to swiftly align the pen stroke image PS2 with the pen stroke image PS1 in a case where a difference has arisen between the pen stroke image PS2 and the pen stroke image PS1 due to the drawing application window position information GAWP or the application state information AS having changed.

In addition, it is desirable for the rendering engine 33 to, if necessary, re-execute the sharing process at S14 each time the drawing application window position information GAWP or the application state information AS is received from the rendering engine agent 34. Alternatively, the rendering engine 33 side at least periodically may confirm whether or not the rendering engine agent 34 has obtained new drawing application window position information GAWP or application state information AS, and may re-execute reception of the drawing application window position information GAWP or the application state information AS and the sharing process at S14, if necessary. As a result, the rendering engine 33 can always generate the pen stroke image PS2 on the basis of the latest information.

Next, refer to FIG. 7. When a user operates the pen P (S20), pen data PD is obtained using the tablet driver 32 in the computer 1. After obtaining the pen data PD, the tablet driver 32 supplies the obtained pen data PD to the rendering engine 33, and uses the tablet channel 42 illustrated in FIG. 1 to also supply the tablet driver 32 in the computer 2 (S21). Processing from S21 until S30 described below is repeatedly executed each time the tablet driver 32 in the computer 1 obtains new pen data PD.

The tablet driver 32 in the computer 2 supplies the supplied pen data PD to the drawing application 36 (S21). After receiving this, the drawing application 36 performs the first rendering process on the basis of each item of data indicated in FIG. 3 (S22) and supplies the window W, which includes the pen stroke image PS2 obtained as a result thereof, to the video device 23 in the computer 2. As a result, the streaming video SV, which includes the pen stroke image PS2 obtained by the first rendering process, is transmitted from the computer 2 to the computer 1 (S24), and the pen stroke image PS2 eventually appears within the desktop video DV1.

Meanwhile, the rendering engine 33 in the computer 1 executes, in parallel with the first rendering process, the second rendering process, which is shared with the first rendering process by the sharing process executed at S14 illustrated in FIG. 6, to thereby generate the pen stroke image PS2 (S25). Specifically, firstly, a curve such as a Bezier curve or a Catmull-Rom spline is derived on the basis of a series of indication positions included in the latest predetermined number of pieces of pen data PD. On the basis of the derived curve, the pen stroke image PS2 is generated on the basis of the data within each item of pen data PD and the brush data obtained at S14 and, from among the generated pen stroke image PS2, drawing is performed for only a portion positioned within the drawing region A3 for which the position and the like have been obtained at S14. However, the rendering engine 33 does not generate the pen stroke image PS2 in a case where it is indicated by the drawing application window position information GAWP or the application state information AS that the drawing application 36 is not generating the pen stroke image PS1.

The rendering engine 33 supplies the pen stroke image PS2 generated at S25 to the video device 23 (S26). The video device 23 composites the supplied pen stroke image PS2 into the desktop video DV1*a* to generate the desktop video DV1, and outputs the generated desktop video DV1 to the display 24 illustrated in FIG. 1 (S27). As a result, at a stage before the display of the pen stroke image PS2 is reflected within the desktop video DV1, a user of the computer 1 can, at the same position as that of the pen stroke image PS1 which is to be displayed later, visually recognize the pen stroke image PS2, which has the same appearance as that of the pen stroke image PS1.

A predetermined amount of time after generating the pen stroke image PS2 at S25, the rendering engine 33 performs a process for erasing the pen stroke image PS2 from the desktop video DV1 (S28). It is sufficient that this process is made to be a process for newly generating a pen stroke image PS2 obtained by deleting the portion, which has been newly generated at S25 before a predetermined amount of time, from the latest pen stroke image PS2. To give a more specific description, it is sufficient that the rendering engine 33 stores the pen data PD supplied from the tablet driver 32 and, each drawing timing, prepares a transparent screen, and draws, on the screen, only what is set to be drawn from among the stored pen data PD (what is first set to be drawn before the predetermined amount of time has elapsed), to thereby execute erasure of the pen stroke image PS2.

The rendering engine 33 supplies the pen stroke image PS2 generated at S25 to the video device 23 (S29). The video device 23 generates the desktop video DV1 in a similar fashion to at S27, and outputs the desktop video DV1 to the display 24 illustrated in FIG. 1 (S30). As a result, a portion that is from among the pen stroke image PS2 and has been generated before the predetermined amount of time disappears from the desktop video DV1.

FIGS. 8A and 8B are each a view that illustrates an example of the streaming video SV and the desktop videos DV1 and DV1*a* while a user is performing a pen input. FIG. 8A illustrates a state that is the predetermined amount of time after that in FIG. 2B, and FIG. 8B illustrates a state that is the predetermined amount of time after that in FIG. 8A. Note that, in actual processing, the erasure process at S28 is performed each time new pen data PD is obtained, but to facilitate understanding, the pen stroke illustrated in FIG. 8A and FIG. 8B is erased by two erasure processes. With reference to FIG. 8A and FIG. 8B, more specific description is given below regarding processing at S28 through S30.

Firstly, referring to FIG. 8A, the pen stroke image PS1 appearing inside the streaming video SV at this time includes only a first-half portion of the illustrated pen stroke. If the first-half portion of the pen stroke that is illustrated at this timing is erased from the pen stroke image PS2, the pen stroke is displayed without interruption in the desktop video DV1 and without the pen stroke image PS1 and the pen stroke image PS2 being overlappingly displayed in the desktop video DV1.

Next, referring to FIG. 8B, the pen stroke image PS1 appearing inside the streaming video SV at this time includes the entirety of the illustrated pen stroke. If a latter-half portion of the pen stroke that is illustrated at this timing is erased from the pen stroke image PS2, the pen stroke continues to be displayed without interruption in the desktop video DV1 and without the pen stroke image PS1 and the pen stroke image PS2 being overlappingly displayed in the desktop video DV1.

In this manner, from among a pen stroke drawn in accordance with a pen input by a user, if a portion appearing within the streaming video SV is sequentially erased from the pen stroke image PS2, the pen stroke image will be displayed without interruption within the desktop video DV1 and without the pen stroke image PS1 and the pen stroke image PS2 being overlappingly displayed within the desktop video DV1. If it is assumed that an amount of time required, after a user performs a pen input, a pen stroke image PS1 indicating a result thereof appearing within the streaming video SV is constant, by performing the erasure process at S28 a predetermined amount of time after the rendering process at S25 is performed as illustrated in FIG. 7, it is possible to realize display of such a pen stroke image.

Here, the predetermined amount of time from the generation of the pen stroke image PS2 until the erasure thereof may be set by the rendering engine 33 in accordance with either of the computers 1 and 2, but it is desirable to perform a predetermined calibration process to thereby measure an actual delay time and set to be performed in response to the measured length of time of the delay. In particular, in a case where it takes time to derive and control pen stroke attributes in accordance with brush data, it is desirable for the computer 2 to set the abovementioned predetermined amount of time to the rendering engine 33. As a result, it becomes possible to more appropriately erase the pen stroke image PS2.

In addition, FIG. 8A illustrates an example in which the appearance of the pen stroke image PS2 completely matches the appearance of the pen stroke image PS1, but the appearance of the pen stroke image PS2 may not necessarily completely match the appearance of the pen stroke image PS1. In other words, from among the pen stroke image displayed at the time for performing the erasure process at S28 illustrated in FIG. 7, the appearance of a portion corresponding to the pen stroke image PS1 may not need to completely match the appearance of a portion corresponding to the pen stroke image PS2. With reference to a specific example, description is given below regarding a pen stroke image PS2 having an appearance that does not completely match the appearance of a pen stroke image PS1.

Figure 9A:
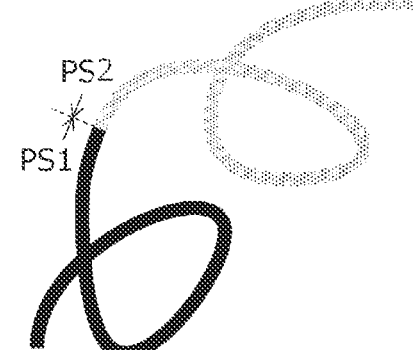
FIGS. 9A through 9C are views that illustrate an example of a second pen stroke image for which the shape matches that of a first pen stroke image while one or a combination of pattern and color thereof differs.
Figure 9B:
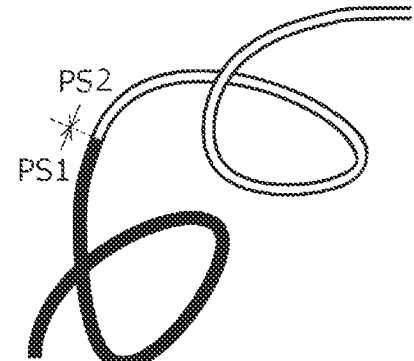
Figure 9C:
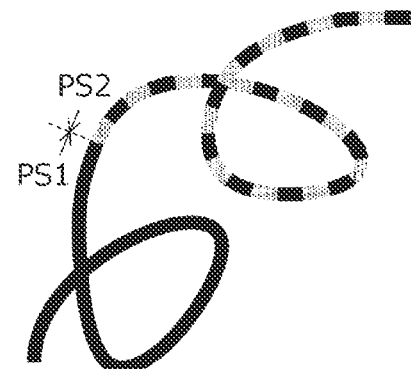

FIG. 9A through FIG. 9C are views that illustrate an example of a pen stroke image PS2 for which the shape matches that of the pen stroke image PS1, while one or a combination of pattern and color thereof differs. The pen stroke image PS1 is drawn using a solid-fill black line in these views, whereas the pen stroke image PS2 in FIG. 9A is drawn using a hatched line, the pen stroke image PS2 in FIG. 9B is drawn using a line having an outline, and the pen stroke image PS2 in FIG. 9C is drawn using a line (what is called a zebra-pattern line) having a different drawing color every predetermined amount of time (for example, every 10 milliseconds). By causing the pen stroke image PS1 and pen stroke image PS2 to differ in one or a combination of pattern and color in this manner, it is possible for a user of the computer 1 to identify which portion is a provisional image. In addition, the drawing color for the pen stroke image PS2 is changed every predetermined amount of time as in FIG. 9C, whereby it is possible to know an approximate number for the delay time at a certain time by counting the number of locations having changed drawing colors in the pen stroke image PS2 being displayed on the display 24 at that time.

Note that, in a case of causing one or a combination of pattern and color to differ between the pen stroke image PS1 and the pen stroke image PS2, the "color" may include a degree of transparency. In addition, how the inside of the outline of the pen stroke image PS2 illustrated in FIG. 9B is painted is not particularly limited. For example, the painting may be solid, hatching may be performed, or the painting may be transparent or translucent.

In addition, in a case of generating the pen stroke image PS2 using a drawing color (including a degree of transparency) differing from that for the pen stroke image PS1, it is desirable for the rendering engine 33 to determine the drawing color for the pen stroke image PS2 on the basis of the color information (information that specifies the drawing color for the pen stroke image PS1) included in the application state information AS obtained from the computer 2. Accordingly, the rendering engine 33 can generate the pen stroke image PS2 by a color (for example, a complementary color for the drawing color for the pen stroke image PS1) that is reliably different from that for the pen stroke image PS1. In addition, it is desirable for the rendering engine 33 to determine the color for the pen stroke image PS2 also on the basis of the background color that is for the drawing region A3 and is included in the application state information AS obtained from the computer 2. Accordingly, as a result of setting the drawing color for the pen stroke image PS2 to a color that is different from the drawing color for the pen stroke image PS1, it is possible to prevent the drawing color for the pen stroke image PS2 becoming the same color or a similar color with respect to the background color for the drawing region A3 and prevent visual recognition of the pen stroke image PS2 becoming difficult.

It is possible to use the pen stroke image PS2 as in the examples illustrated in FIG. 9B or FIG. 9C to prevent the drawing color for the pen stroke image PS2 becoming the same color or a similar color with respect to the background color for the drawing region A3 and prevent visual recognition of the pen stroke image PS2 becoming difficult. In other words, the rendering engine 33 may use a pattern resulting from mixing two or more colors as in the example illustrated in FIG. 9C to generate the pen stroke image PS2 and thereby ensure visibility for the pen stroke image PS2, or may provide an outline for the pen stroke image PS2 as in the example illustrated in FIG. 9B to thereby ensure visibility for the pen stroke image PS2. In addition, it is also possible to ensure visibility for the pen stroke image PS2 by causing a drawing color or pattern for the pen stroke image PS2 to change over time (for example, causing blinking).

Figure 9D:
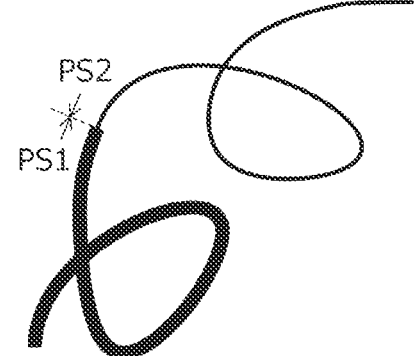
FIG. 9D is a view that illustrates an example of the second pen stroke image that, while matching the trajectory (center line of the shape) of the first pen stroke image-, has a different shape.

FIG. 9D is a view that illustrates an example of a pen stroke image PS2 that, while matching the trajectory (center line of the shape) of the pen stroke image PS1, has a different shape. In accordance with the example in the same figure, the rendering engine 33 is generating the pen stroke image PS2 by a line width that is thinner than the line width for the pen stroke image PS1. In other words, in accordance with the example in the same figure, the rendering engine 33 causes the line width to differ from that for the pen stroke image PS1 while using the same interpolation curve (such as the above-described Bezier curve or Catmull-Rom spline) as the pen stroke image PS1 to generate the pen stroke image PS2. Accordingly, an effect of reducing a degree of delay that a user feels in comparison to, inter alia, a case of changing the drawing color is achieved and the trajectories match between the pen stroke image PS1 and the pen stroke image PS2. Therefore, it is possible to realize processing having lower discomfort for the user.

Figure 10:
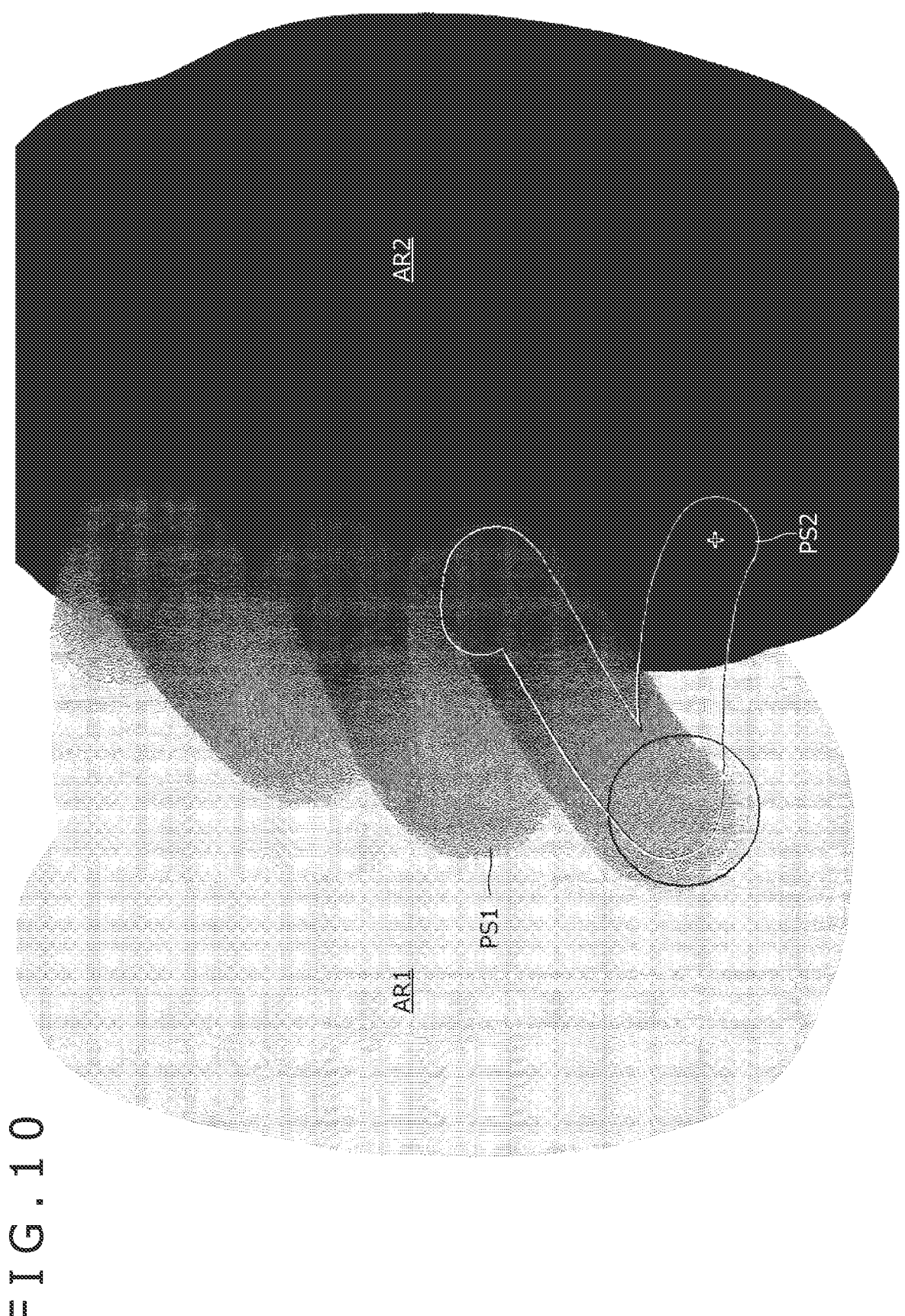
FIG. 10 is a view that illustrates an example of the first and second pen stroke images in a case where the first pen stroke image represents a special stroke.

FIG. 10 illustrates an example for pen stroke images PS1 and PS2 in a case where the pen stroke image PS1 generated by the drawing application 36 represents a stroke (hereinafter, referred to as a "special stroke") that is not a stroke for drawing a line. The pen stroke image PS1 in accordance with this example indicates a stroke for mixing colors. FIG. 10 illustrates, in a state where a region AR1 painted in a relatively faint color and a region AR2 painted in a relatively dark color are adjacently displayed within the virtual desktop region VDI, a state where a user moves the pen P near the boundary between the regions AR1 and AR2 and the colors for the regions AR1 and AR2 are mixed due to the pen stroke image PS1 inputted as a result thereof. The pen stroke image PS1 in this case is indicated by a region in which the colors are mixed. As other examples of the special stroke, it is possible to give, inter alia, a stroke for sculpting (an operation for working clay) a three-dimensional model. In contrast, the pen stroke image PS2 is drawn using a line that has an outline, similarly to the example illustrated in FIG. 9B. However, FIG. 10 illustrates an example in which the line width for the pen stroke image PS2 is narrower than the line width for the pen stroke image PS1 and the inside of the outline that configures the pen stroke image PS2 is made to be transparent.

In a case where the pen stroke image PS1 is a special stroke, there are cases where it is difficult for the rendering engine 33 to share the first rendering process executed by the drawing application 36 even if the drawing application window position information GAWP and the application state information AS are used. Referring to the example in FIG. 10, information regarding the regions AR1 and AR2 is essential for the rendering engine 33 to draw the pen stroke image PS2 to have completely the same appearance as the pen stroke image PS1 but, because the drawing application window position information GAWP and the application state information AS do not include information regarding the regions AR1 and AR2, the appearances of the pen stroke image PS1 and the pen stroke image PS2 will not completely match using the sharing process at S14 described above. When such a pen stroke image PS2 is overlappingly drawn on the pen stroke image PS1, the pen stroke image PS1 will be obscured by the pen stroke image PS2, which is unnatural, and a result might be achieved in that discomfort felt by a user rather increases. On this point, as exemplified in FIG. 10, by configuring the pen stroke image PS2 by an outline, it is possible to indicate the position at which operation is underway to the user without discomfort. Note that, although FIG. 10 illustrates an example in which the drawing color for the region surrounded by the outline is transparent, the drawing color may be translucent.

By virtue of the image processing method according to the present embodiment as described above, because the second rendering process executed by the computer 1 is shared with the first rendering process executed by the computer 2, the computer 1 can use an advanced drawing process that considers pen tip attributes to draw the pen stroke image PS2, which is a provisional image.

In addition, by virtue of the image processing method according to the present embodiment, because it is possible to restrict a region in which the pen stroke image PS2 is composited by the video device 23 to within the drawing region A3, it is possible to limit drawing of the pen stroke image PS2 outside the drawing region A3.

Furthermore, by virtue of image processing method according to the present embodiment, because a process for erasing the pen stroke image PS2 is performed after a predetermined amount of time from the generation, it is possible to display a pen stroke image within the desktop video DV1 without interruption and without the pen stroke image PS1 and the pen stroke image PS2 being overlappingly displayed.

Note that, by virtue of the present embodiment, the pen stroke image PS2 is erased little by little in units of indication position for the pen P at S28 in FIG. 7, but the rendering engine 33 may collectively erase a pen stroke image PS2 for a plurality of indication positions. As a result, it is possible to reduce load on the processor 20.

Figure 11:
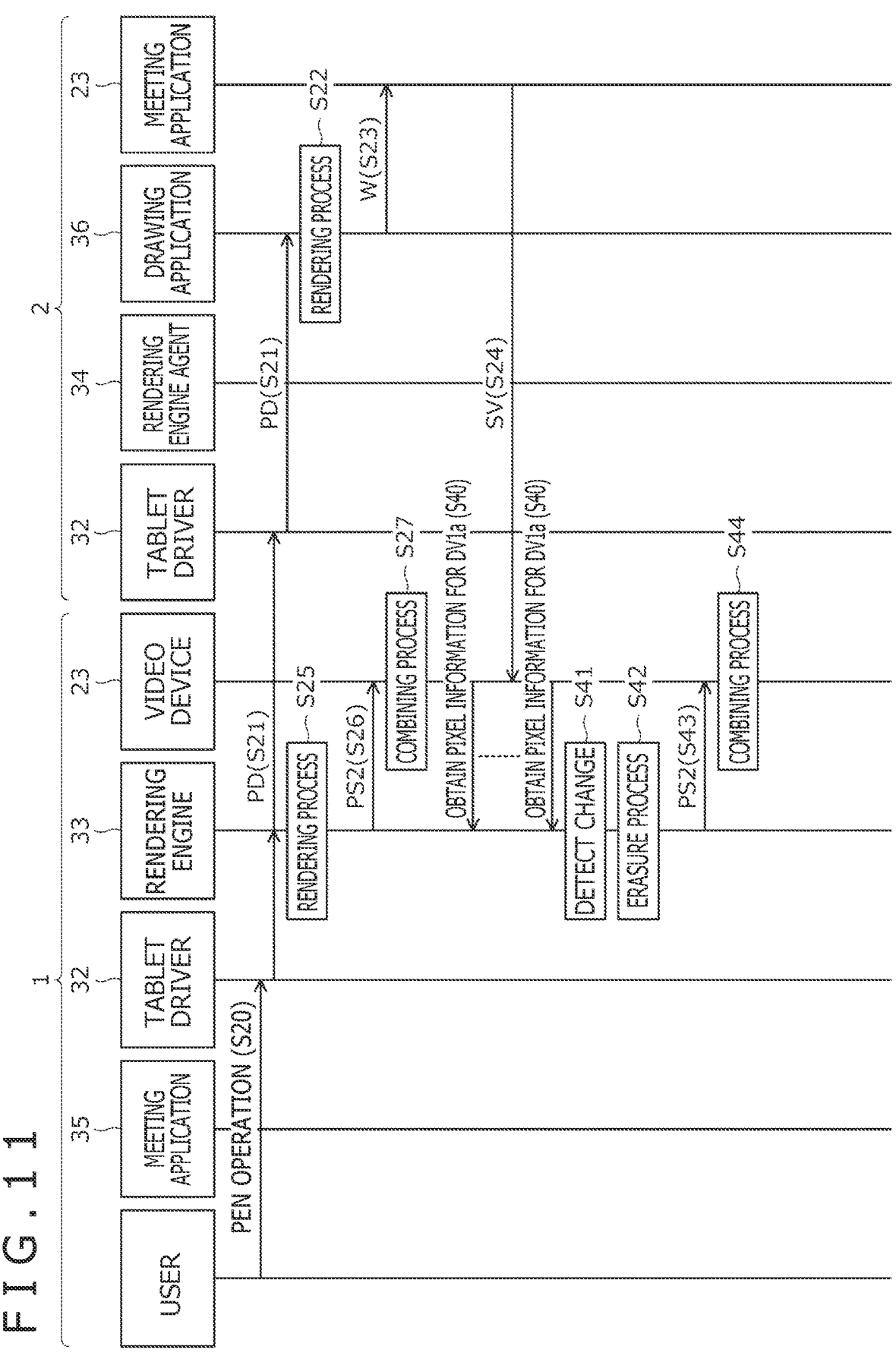
FIG. 11 is a view that illustrates a sequence for describing an image processing method according to a second embodiment of the present disclosure.

FIG. 11 is a view that illustrates a sequence for describing an image processing method according to a second embodiment of the present disclosure. The image processing method according to the present embodiment differs from the image processing method according to the first embodiment in a method of erasing the pen stroke image PS2. Description is given below by focusing on differences with the image processing method according to the first embodiment.

As is understood by comparing FIG. 11 with FIG. 7, processing until S27 is the same as processing according to the first embodiment. In the present embodiment, the rendering engine 33, which has executed processing at S25 and S26, in place of waiting a predetermined amount of time, obtains pixel information for, from among the desktop video DV1a, a position corresponding to a portion of the pen stroke image PS2, which has been newly generated at S25 (S40). The rendering engine 33 repeatedly executes, for example periodically, the processing in S40.

When a portion of the pen stroke image PS1 corresponding to the portion of the pen stroke image PS2 newly generated at S25 is included in the streaming video SV, a change appears in the pixel information at S40. The rendering engine 33, upon detecting this change (S41), performs processing for erasing the corresponding portion from among the pen stroke image PS2 (S42), and supplies the newly generated pen stroke image PS2 to the video device 23 (S43). After receiving this pen stroke image PS2, the video device 23 generates the desktop video DV1 similarly to S30 illustrated in FIG. 7, and outputs the desktop video DV1 to the display 24 illustrated in FIG. 1 (S44).

By employing such processing, the rendering engine 33 can, as needed, erase a portion from among the pen stroke image PS2 that has appeared in the streaming video SV. Accordingly, by virtue of the image processing method according to the present embodiment, it is possible to display a pen stroke without interruption even if, by some chance, delay has increased.

Note that the method of erasing the pen stroke image PS2 according to the present embodiment may be used in combination with the method of erasing the pen stroke image PS2 described with reference to FIG. 7. By virtue of the method of erasing the pen stroke image PS2 according to the present embodiment, in a case where it is assumed that the drawing application 36 uses a function (a function for increasing the line width the longer the stay time for the pen P at the same position) for reproducing the above-described situation in which ink spreads to draw the pen stroke image PS2 and the pen P has continued to stay at the same position on the touch surface, a change does not appear in pixels in the periphery of the pen tip and the pen stroke image PS1 is not erased regardless of how much time elapses. If the method of erasing the pen stroke image PS2 described with reference to FIG. 7 is used in combination, even in such a case, it is possible to erase the pen stroke image PS1 after a predetermined amount of time has elapsed.

FIG. 12 is a view that illustrates a sequence for describing an image processing method according to a third embodiment of the present disclosure. The image processing method according to the present embodiment also differs from the image processing method according to the first embodiment in a method of erasing the pen stroke image PS2. Description is given below by focusing on differences with the image processing method according to the first embodiment.

As is understood by comparing FIG. 12 with FIG. 7, processing until S27 is the same as processing according to the first embodiment. The tablet driver 32 in the computer 2 according to the present embodiment, after having supplied the pen data PD to the drawing application 36 at S21 (in other words, after rendering by the drawing application 36 has started), transmits serial information SN for this pen data PD to the tablet driver 32 in the computer 1 via the tablet channel 42 (S50). The tablet driver 32 in the computer 1 transfers the serial information SN received in this manner to the rendering engine 33 (S51).

After receiving supply of the serial information SN from the tablet driver 32, the rendering engine 33 performs processing for erasing, from among the generated pen stroke image PS2, a portion corresponding to the supplied serial information SN (S52), and supplies a newly generated pen stroke image PS2 to the video device 23 (S53). After receiving this pen stroke image PS2, the video device 23 generates the desktop video DV1 similarly to S30 illustrated in FIG. 7, and outputs the desktop video DV1 to the display 24 illustrated in FIG. 1 (S54).

By employing such processing, from among a generated pen stroke image PS2, the rendering engine 33 can, as needed, erase a portion corresponding to pen data PD for which rendering has started within the computer 2. Because supply of the serial information SN to the computer 1 normally slightly precedes supply of the streaming video SV, by virtue of the image processing method according to the present embodiment, it is possible to erase the pen stroke image PS2 in alignment with a timing at which the pen stroke image PS1 is displayed.

Note that the method of erasing the pen stroke image PS2 according to the present embodiment may be used in combination with the method of erasing the pen stroke image PS2 described with reference to FIG. 7. As a result, even if transmission of the serial information SN at S50 is delayed by some chance and erasure based on the serial information SN cannot be performed at a suitable timing, it is possible to reliably erase the pen stroke image PS1 after a predetermined amount of time has elapsed. Further, the method of erasing the pen stroke image PS2 in accordance with the present embodiment may be used in combination with the method of erasing the pen stroke image PS2 described with reference to FIG. 11, or the method of erasing the pen stroke image PS2 in accordance with the present embodiment may be used in combination with both the method of erasing the pen stroke image PS2 described with reference to FIG. 7 and the method of erasing the pen stroke image PS2 described with reference to FIG. 11.

In addition, instead of transmitting the serial information SN for all pieces of pen data PD, the tablet driver 32 in the computer 2 intermittently may transmit the serial information SN, such as every few pieces thereof. As a result, it is possible to reduce communication resources used to transmit the serial information SN.

Figure 13:
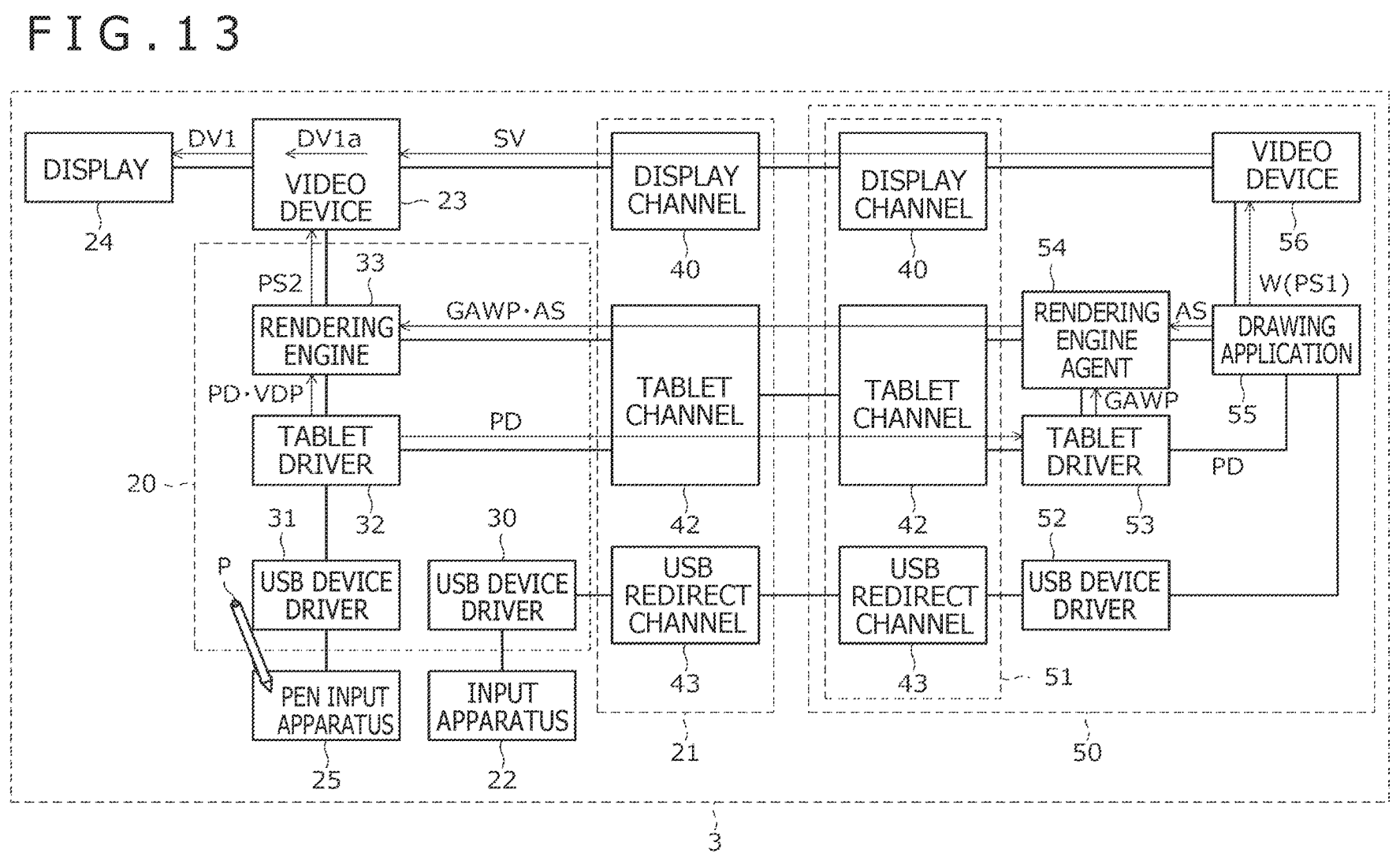

FIG. 13 is a view that illustrates a system configuration of a computer 3 that executes an image processing method according to a fourth embodiment of the present disclosure. The image processing method according to the present embodiment differs from the image processing method according to the first embodiment in being executed by one computer 3. Description is given below regarding a configuration for and operation by the computer 3, by focusing on differences with the computers 1 and 2 according to the first embodiment.

The computer 3 differs from the computer 1 illustrated in FIG. 1 in executing a virtual machine 50. The virtual machine 50 is a virtual computer used in order to execute a second operating system on the computer 3, and is realized by the processor 20 executing a predetermined program. In a typical example, the virtual machine 50 is used in a case of desiring to use a drawing application that does not operate under the operating system for the computer 3.

As illustrated in FIG. 13, the virtual machine 50 is configured to have a communication unit 51, a USB device driver 52, a tablet driver 53, a rendering engine agent 54, a drawing application 55, and a video device 56. Basic operations for these are similar to those for the communication apparatus 21, the USB device driver 30, the tablet driver 32, the rendering engine agent 34, the drawing application 36, and the video device 23 which are illustrated in FIG. 1. However, in the computer 3, the streaming video SV indicates the window W. In addition, activation of the drawing application 55 is executed in accordance with a user operation with respect to the computer 3.

In the present embodiment, the processor 20 functions as a local-side apparatus, and the virtual machine 50 functions as a remote-side apparatus. The streaming video SV, which includes the window W generated by the drawing application 55, is supplied from the virtual machine 50 to the processor 20, and is disposed within the desktop video DV1. A point that the second rendering process executed by the processor 20 is shared with the first rendering process executed by the virtual machine 50 is similar to that in the first embodiment. Accordingly, by virtue of the image processing method according to the present embodiment, the processor 20 can use an advanced drawing process that considers pen tip attributes to draw the pen stroke image PS2, which is a provisional image.

In addition, by virtue of the image processing method according to the present embodiment, it is also possible to restrict a region in which the pen stroke image PS2 is composited by the video device 23 to a region within the drawing region A3. Accordingly, it is possible to restrict the pen stroke image PS2 from being drawn outside the drawing region A3.

Note that the virtual machine 50 may be an application that operates on a web browser. A drawing application that operates on a web browser, a desktop virtualization application used in a screen transfer type thin client, or the like may be given as examples of such an application. A location where the application actually operates may be on the computer 3 or may be on a server computer connected to the computer 3 via a network. In any case, by using the image processing method according to the present embodiment, it is possible to use an advanced drawing process that considers pen tip attributes to draw the pen stroke image PS2, which is a provisional image.

FIG. 14 is a view that illustrates a system configuration of computers 1 and 2 that execute an image processing method according to a fifth embodiment of the present disclosure. The image processing method according to the present embodiment differs from the first embodiment in that generation and rendering of a pen stroke image PS2 is performed inside the pen input apparatus 25. Description is given below regarding a configuration for and operation by the computers 1 and 2 according to the present embodiment, by focusing on differences with the computers 1 and 2 according to the first embodiment.

The pen input apparatus 25 according to the present embodiment is what is called an LCD tablet (tablet having a liquid-crystal screen), and includes a touch sensor 25a, a pen processing unit 25b, a drawing processing unit 25c, and a foremost screen display processing unit 25d as illustrated in FIG. 14. In the present embodiment, the display 24 also forms a portion of the pen input apparatus 25. However, the type of the pen input apparatus 25 is not limited to an LCD tablet and may be a signature tablet having a small screen, for example. In this case, the display 24 does not form a portion of the pen input apparatus 25, and a small display separate from the display 24 is disposed within the pen input apparatus 25.

The touch sensor 25a is an apparatus that includes a plurality of sensor electrodes disposed on the touch surface. The pen processing unit 25b is a functional unit including an integrated circuit and has functionality which corresponds to the sensor controller described above. In other words, the pen processing unit 25b fulfills a role for, in accordance with the active capacitive method or the electromagnetic induction method, for example, using the touch sensor 25 to detect two-dimensional coordinates indicating an indication position for the pen P, and receiving data such as a pen pressure value from the pen P. The pen processing unit 25b is connected to the tablet driver 32 via the USB device driver 31 and is also connected to the drawing processing unit 25c and, upon detecting an indication position for the pen P, is configured to supply the detected indication position for the pen P and the data (pen data PD) received from the pen P to both the tablet driver 32 and the drawing processing unit 25c.

Here, the rendering engine 33 according to the present embodiment is configured to supply the drawing application window position information GAWP and the application state information AS, which are received from the rendering engine agent 34, to the tablet driver 32. In addition, the tablet driver 32 is configured to supply the drawing application window position information GAWP and the application state information AS supplied from the rendering engine 33, together with obtained virtual desktop information VDP, to the pen processing unit 25b via the USB device driver 31. The pen processing unit 25b is configured to supply the drawing application window position information GAWP, the application state information AS, and the virtual desktop information VDP, which are supplied from the tablet driver 32 in this manner, to the drawing processing unit 25c.

The drawing processing unit 25c is also a functional unit that includes an integrated circuit, similarly to the rendering engine 33, and has functionality for generating a pen stroke image PS2 on the basis of information supplied from the pen processing unit 25b. To give a description in detail, the drawing processing unit 25c firstly obtains the position and size of the virtual desktop region VDI within the desktop video DV1 on the basis of the virtual desktop information VDP, and next obtains the position and size of the window W within the virtual desktop region VDI on the basis of the drawing application window position information GAWP. Configuration is such that, on the basis of campus area information within the application state information AS, the position, size, shape, and background color for the drawing region A3 within the window W are obtained, and the pen stroke image PS2 is drawn inside the drawing region A3 which is obtained in this manner. The drawing processing unit 25c is also configured to obtain brush data on the basis of drawing setting information within the application state information AS and use this obtained brush data to perform a rendering process based on the pen data PD to thereby generate the pen stroke image PS2.

The foremost screen display processing unit 25d is also a functional unit including an integrated circuit, and includes a memory for temporarily storing a video signal for display by the display 24. The foremost screen display processing unit 25d is configured to store the pen stroke image PS2 generated by the drawing processing unit 25c in this memory. In addition, the foremost screen display processing unit 25d also performs processing for receiving the desktop video DV1 from the video device 23 and outputting the desktop video DV1 to the display 24 together with the video signal stored in the abovementioned memory. After receiving this output, the display 24 displays the pen stroke image PS2 overlapped on the desktop video DV1. As a result, a user can see a video formed by compositing the pen stroke image PS2 onto the desktop video DV1 in the display 24.

Accordingly, by virtue of the image processing method according to the present embodiment, similarly to with the computer 1 according to the first embodiment, the computer 1 can use an advanced drawing process that considers pen tip attributes to draw the pen stroke image PS2, which is a provisional image.

Note that, in the computer 1 according to the present embodiment and as indicated by broken lines in FIG. 14, the pen stroke image PS2 can be generated by the rendering engine 33, similarly to the computer 1 according to the first embodiment. In this case, the tablet driver 32 may determine whether or not the drawing processing unit 25c supports pen tip attributes indicated by the application state information AS supplied from the rendering engine 33 and may switch a location for generating the pen stroke image PS2 from the drawing processing unit 25c to the rendering engine 33 in a case where not supporting is determined. By employing such a switching process, it is possible to display the pen stroke image PS2 with the same appearance as that of the pen stroke image PS1 even in a case of executing an advanced drawing process (brush shape, brush behavior, etc.) that the drawing processing unit 25c does not support.

In addition, the drawing processing unit 25c may use a method that is similar to one or both of the method of erasing the pen stroke image PS2 described with reference to FIG. 7 and the method of erasing the pen stroke image PS2 described with reference to FIG. 12 to thereby perform processing for erasing the pen stroke image PS2 from an image supplied by the foremost screen display processing unit 25d to the display 24. As a result, it is possible to erase, as appropriate, a portion that is from among the pen stroke image PS2 generated by the drawing processing unit 25c and is to be displayed as the pen stroke image PS1.

In addition, the pen processing unit 25b, the drawing processing unit 25c, and the foremost screen display processing unit 25d may include one integrated circuit or may include two or more integrated circuits. In the latter case, it is desirable to use an MCU (Micro Controller Unit) in a case of configuring the pen processing unit 25b and the drawing processing unit 25c by one integrated circuit. In addition, it is desirable to use a scaler IC (Scaler IC) in a case of configuring the drawing processing unit 25c and the foremost screen display processing unit 25d by one integrated circuit. Note that, in a case of using a plurality of integrated circuits, it is typical for respective integrated circuits to be mutually connected via a peripheral device interface other than USB, such as I2C (Inter-Integrated Circuit) or UART (Universal Asynchronous Receiver/Transmitter).

Description is given above regarding preferable embodiments of the present disclosure, but the present disclosure is not limited whatsoever to these embodiments, and it goes without saying that the present disclosure can be worked in various aspects within a scope that does not deviate from the substance thereof.

For example, the rendering engine 33 may detect an indication position for the pen P when a pen-down has occurred (in other words, when the pen pressure value has changed from 0 to a value greater than 0), and perform the second rendering process only in a case where this indication position is within the drawing region A3. In addition, the rendering engine 33 may continue to execute the second rendering process without changing the position of the drawing region A3 (in other words, while securing the drawing region A3) even if, hypothetically, in a duration from a pen-down to a pen-up (in other words, until the pen pressure value returns to 0), new drawing application window position information GAWP or application state information AS is received and a change of the position of the drawing region A3 is indicated thereby. In contrast, the rendering engine 33 may first erase all of a pen stroke image PS2 being displayed in a case where new drawing application window position information GAWP or application state information AS is received and a change to the position of the drawing region A3 is indicated thereby.

In addition, from among the configuration illustrated in FIG. 13, the tablet driver 32 and the rendering engine 33 may be provided within an integrated circuit whereas the tablet driver 53, the rendering engine agent 54, and the drawing application 55 are provided within the processor 20, and the pen stroke image PS2 is generated within the integrated circuit in a duration until the pen stroke image PS1 generated by the drawing application 55 is reflected to the desktop video DV1. As a result, it is possible to apply the present disclosure to the computer 3 while employing the integrated circuit as a local-side apparatus and the processor 20 as a remote-side apparatus.

In addition, deviation between the pen tip of the pen P and the front end of the pen stroke image PS1 displayed on the display 24 belonging to the computer 1 gets smaller as the display 24 becomes smaller, and gets larger as the display 24 becomes larger. Accordingly, the rendering engine 33 may control the presence of the pen stroke image PS2 in accordance with the size of the display 24. To give a more specific description, the rendering engine 33 may weaken the presence of the pen stroke image PS2 as the display 24 becomes smaller. For example, the rendering engine 33 may turn generation of the pen stroke image PS2 off in a case where the size of the display 24 is less than or equal to a predetermined value. In addition, as the display 24 becomes smaller, the rendering engine 33 may shorten an amount of time from generating the pen stroke image PS2 at S25 illustrated in FIG. 7 until erasing the pen stroke image PS2 at S28 illustrated in FIG. 7. In addition, the rendering engine 33 may make the line width of the pen stroke image PS2 thinner as the display 24 becomes smaller, or may increase the degree of transparency of the pen stroke image PS2 (in other words, make the drawing color fainter) as the display 24 becomes smaller.

In addition, it may be configured such that a setting screen for setting a specific method of generating the pen stroke image PS2 (for example, drawing color, pattern, presence or absence of outline, etc.) is displayed within the desktop video DV1 and a user of the computer 1 can set the method of generating the pen stroke image PS2. In this case, the rendering engine agent 34 or the drawing application 36 may draw the setting screen within the virtual desktop region VDI (or within the window W). As a result, in a case where the virtual desktop region VDI is displayed in the entire display 24, it is possible to change the method of generating the pen stroke image PS2 without minimizing or moving the virtual desktop region VDI.

In contrast, the rendering engine 33 (in the example in FIG. 14, the drawing processing unit 25c) in the computer 1 may draw a setting screen for setting a specific method of generating the pen stroke image PS2 outside the virtual desktop region VDI. As a result, because a user can set the appearance of the pen stroke image PS2 within the local-side apparatus, even if transmission of the application state information AS from the rendering engine agent 34 to the rendering engine 33 is delayed, it is possible to draw the pen stroke image PS2, which is a provisional image, using an advanced drawing process that considers pen tip attributes, in a duration until the application state information AS is received. Note that one or more frequently-used generation methods are preset within the rendering engine 33 and the setting screen is configured such that it is possible to set a method of generating the pen stroke image PS2 by just selecting one of the one or more preset generation methods.

Note that the rendering engine 33 in the computer 1 may execute an operation for displaying the abovementioned setting screen in response to a change in button information included in data supplied from the pen input apparatus 25. For example, the abovementioned setting screen may be displayed in a case where the button information included in the data supplied from the pen input apparatus 25 indicates that the state of a predetermined switch provided on the pen P is changed from off to on. As a result, a user can cause the computer 1 to display the abovementioned setting screen by pressing the predetermined switch provided on the pen P. In this case, from among the pen data PD to transmit to computer 2, it is desirable for the tablet driver 32 not to notify the computer 2 that the state of the abovementioned predetermined switch has changed to on by fixing a value for button information corresponding to the abovementioned predetermined switch to be a value indicating constantly off irrespective of the content of the data supplied from the pen input apparatus 25 to thereby. As a result, it is possible to avoid two operation results (display of the abovementioned setting screen on the computer 1 and another operation executed by the computer 2) occurring by one switch operation, which would puzzle the user.

In addition, one or more switches (such as an on-off button or a touch ring) may be provided on the pen input apparatus 25, and information indicating the state of each of the one or more switches provided on the pen input apparatus 25 may be disposed within the pen data PD. In addition, the rendering engine 33 in the computer 1 may execute an operation for displaying the abovementioned setting screen in response to a state change for a predetermined switch provided on the pen input apparatus 25. In this case, if information indicating the state of the predetermined switch is disposed within the pen data PD, it is desirable for the tablet driver 32 in the computer 1 not to notify the state of the predetermined switch to the computer 2 by making information indicating the state of the predetermined switch be fixed regardless of the actual state of the predetermined switch while at least the state of the predetermined switch is associated with an operation for displaying the setting screen.

In addition, flag information, which indicating whether or not each item of data included in the pen data PD is to be transmitted to the computer 2, may be stored within the tablet driver 32 in the computer 1, and the rendering 33 or the meeting application 35 may control values in this flag information in accordance with information being displayed by the display 24. It may be configured such that the tablet driver 32 does not transmit data for which no transmission to the computer 2 is indicated by the flag information (or fixes a value to transmit to a predetermined value). As a result, for example, in a case where an indication position for the pen P is present within a menu screen being displayed by the rendering 33 or the meeting application 35, it is possible not to transmit coordinate data for the pen P to the computer 2, whereby it is possible to prevent the pen stroke image PS1 being drawn in the computer 2 when a user for the computer 1 is using the pen P to operate a menu.

In addition, each of the computers 1 and 2 may have a plurality of displays 24. In this case, a result of joining screens respectively displayed by the plurality of displays 24 belonging to the computer 2 may be employed as the desktop video DV2. In a case where the virtual desktop region VDI does not fit within the desktop video DV1, the virtual desktop region VDI may be reduced, or only a portion of the virtual desktop region VDI may be displayed within the desktop video DV1.

In addition, the pen input apparatus 25 may be integrally configured with the display 24 which is made to be what is called a liquid-crystal tablet, or may be configured as a separate body from the display 24 which is made to be what is called a board tablet. In the former case, if the computer 1 has a plurality of displays 24, each of them may be configured as a liquid-crystal tablet. In the latter case, by virtue of processing by the rendering engine 33 described in the second embodiment, the rendering engine 33 draws the pen stroke image PS2 to join a cursor indicating the position of the pen P displayed on the display 24 belonging to the computer 1 and the front end of the pen stroke image PS1 that has appeared in the streaming video SV.

In addition, the pen input apparatus 25 may be configured to be able to detect a plurality of pens P at the same time. In this case, it is desirable for the rendering engine 33 to generate the pen stroke image PS2 for each pen P.

In addition, it may be configured such that, together with a pen P or in place of a pen P, writing into the virtual desktop region VDI using a passive pointer such as a finger can be performed. In this case, it is desirable for the rendering engine 33 to generate a provisional image, similarly to the pen stroke image PS2, also for a stroke indicated by a series of indication positions for the passive pointer.

In addition, the meeting application 35 may be configured as a browser plugin or may be configured as an application separate from a browser.

In addition, the present disclosure can be widely applied not only to a case of performing a remote meeting described in the above embodiments, but to a case of sharing a screen (desktop screen or application window) belonging to one computer (a remote-side apparatus) with another computer (a local-side apparatus).

DETAILED DESCRIPTION 1-3: Computer
20: Processor

21: Communication apparatus
22: Input apparatus
23, 56: Video device
24: Display
25: Pen input apparatus
25a: Touch sensor
25b: Pen processing unit
25c: Drawing processing unit
25d: Foremost screen display processing unit
30, 31, 52: Device driver
32, 53: Tablet driver
33: Rendering engine
34, 54: Rendering engine agent
35, 45: Meeting application
36, 55: Drawing application
40: Display channel
41: Data channel
42: Tablet channel
43: Redirect channel
50: Virtual machine
51: Communication unit
A1: Main area
A2: Campus area
A3: Drawing region
AS: Application state information
DV1, DV1a, DV2: Desktop video
GAWP: Drawing application window position information
P: Pen
P1-P4: Indication position for pen P
PD: Pen data
PS1, PS2: Pen stroke image
SV: Streaming video
VDI: Virtual desktop region
VDP: Virtual desktop information
W: Window for drawing application 36

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An image processing method performed by a remote-side apparatus and a local-side apparatus, the method comprising:

transmitting, by the remote-side apparatus, a streaming video that includes an image generated by a first rendering process;

generating, by the local-side apparatus, a provisional image by performing a second rendering process shared with the first rendering process in parallel with the first rendering process;

receiving, by the local-side apparatus, the streaming video from the remote-side apparatus via communication that incurs a delay;

compositing, by the local-side apparatus, the provisional image into the streaming video;

outputting, by the local-side apparatus, the streaming video;

transmitting, by the remote-side apparatus, to the local-side apparatus, information indicating, from among positions indicated by a pen and sequentially received from the local-side apparatus, a position indicated by the pen for which the first rendering process has started;

erasing, by the local-side apparatus, from the provisional image, a portion corresponding to the position indicated by the pen for which start of the first rendering process is indicated by the information from the remote-side apparatus;

displaying, by the local-side apparatus, on a display, a setting screen that sets a generation method for a second pen stroke image, wherein the second rendering process uses the generation method set using the setting screen to draw the second pen stroke image until sharing between the first rendering process and the second rendering process completes, wherein the displaying displays the setting screen in response to a state of a predetermined switch of the pen having changed to a first state, and wherein the local-side apparatus does not notify the remote-side apparatus that the state of the predetermined switch of the pen has changed to the first state.

2. The image processing method according to claim 1, wherein the delay includes at least one of a network delay, an image compression encoding delay, or a buffering delay.

3. The image processing method according to claim 1, comprising:

detecting, by the local-side apparatus, a plurality of positions indicated by-a the pen; and transmitting, by the local-side apparatus, the positions indicated by the pen to the remote-side apparatus, and wherein each of the first rendering process and the second rendering process draws a pen stroke image based on the positions indicated by the pen.

4. The image processing method according to claim 3, wherein sharing between the first rendering process and the second rendering process includes sharing, between the local-side apparatus and the remote-side apparatus, a pen tip attribute referred to when drawing the pen stroke image.

5. The image processing method according to claim 4, wherein the pen tip attribute includes a shape of a pen tip of the pen.

6. The image processing method according to claim 4, wherein the pen tip attribute includes a drawing color of the pen stroke image.

7. The image processing method according to claim 4, wherein the pen tip attribute includes a function used to derive a pen stroke attribute based on information pertaining to the pen.

8. The image processing method according to claim 7, wherein:

the information pertaining to the pen includes a pen pressure value, and the pen stroke attribute includes a line width.

9. The image processing method according to claim 4, wherein the pen tip attribute includes a random number seed used with particle scattering to draw the pen stroke image.

10. The image processing method according to claim 4, wherein the local-side apparatus, after detecting the pen, at least periodically receives information pertaining to the pen tip attribute from the remote-side apparatus.

11. The image processing method according to claim 3, wherein sharing between the first rendering process and the second rendering process includes sharing, between the local-side apparatus and the remote-side apparatus, a drawing region for a pen stroke.

12. The image processing method according to claim 11, wherein the second rendering process draws the pen stroke image within the drawing region.

13. The image processing method according to claim 11, wherein the local-side apparatus performs the second rendering process in a case where a pen-down position for the pen is within the drawing region.

14. The image processing method according to claim 11, wherein the local-side apparatus, after making the drawing region be fixed, performs the second rendering process in a duration from a pen-down to a pen-up, for the pen.

15. The image processing method according to claim 3, wherein a second pen stroke image drawn by the second rendering process has a shape matching a first pen stroke image drawn by the first rendering process, and the second pen stroke image differs from the first pen stroke image in at least one of a pattern or a color.

16. The image processing method according to claim 15, comprising:
    erasing, by the local-side apparatus, the provisional image composited with the streaming video,
    wherein, from a pen stroke image displayed at a time of the erasing, a portion corresponding to the first pen stroke image differs from a portion corresponding to the second pen stroke image in at least one of a pattern or a color.

17. The image processing method according to claim 16, wherein the color includes a degree of transparency.

18. The image processing method according to claim 15, wherein the local-side apparatus uses a pattern resulting from mixing two or more colors to generate the second pen stroke image.

19. The image processing method according to claim 15, wherein the local-side apparatus determines a drawing color for the second pen stroke image based on information that specifies a drawing color for the first pen stroke image and is obtained from the remote-side apparatus.

20. The image processing method according to claim 15, wherein the local-side apparatus determines a drawing color for the second pen stroke image based on a background color for a drawing region.

21. The image processing method according to claim 15, wherein the local-side apparatus uses an outline to draw the second pen stroke image in a case where the first pen stroke image is not a stroke for drawing a line.

22. The image processing method according to claim 3, wherein a second pen stroke image drawn by the second rendering process has a trajectory matching a first pen stroke image drawn by the first rendering process, and the second pen stroke image differs from the first pen stroke image in shape.

23. The image processing method according to claim 3, comprising:
    transmitting, by the local-side apparatus, a plurality of pieces of data pertaining to the pen including a position indicated by the pen to the remote-side apparatus;

storing, by the local-side apparatus, flag information indicating whether to transmit each of the plurality of pieces of data; and
    controlling, the local-side apparatus, the flag information in accordance with information displayed by a display of the local-side apparatus,
    wherein the local-side apparatus does not transmit, to the remote-side apparatus, data from among the plurality of pieces of data for which no transmission is indicated by the flag information.

24. The image processing method according to claim 1, comprising:
    erasing, by the local-side apparatus, a portion of the provisional image for which a predetermined amount of time has elapsed after generation.

25. The image processing method according to claim 24, wherein the predetermined amount of time is set by the remote-side apparatus.

26. The image processing method according to claim 24, wherein the predetermined amount of time is set based on a length of time for the delay.

27. The image processing method according to claim 1, comprising:
    erasing, by the local-side apparatus, a portion of the provisional image that has appeared within the streaming video.

28. The image processing method according to claim 1, wherein the remote-side apparatus and the local-side apparatus are computers that are separate from one another.

29. The image processing method according to claim 1, wherein:
    the local-side apparatus is a central processing unit in a computer, and
    the remote-side apparatus is a virtual machine that operates within the local-side apparatus.

30. The image processing method according to claim 1, wherein:
    the local-side apparatus is an integrated circuit provided within a computer, and
    the remote-side apparatus is a central processing unit in the computer.

31. The image processing method according to claim 1, wherein:
    the local-side apparatus is a central processing unit in a computer, and
    the remote-side apparatus is an application that operates on a web browser.

32. The image processing method according to claim 1, wherein:
    the local-side apparatus includes a pen input apparatus, and
    the generating the provisional image is performed by an integrated circuit within the pen input apparatus.

33. The image processing method according to claim 32, wherein:
    the pen input apparatus includes a display apparatus, and
    the method further comprises:
        outputting, by the pen input apparatus, separately from the compositing the provisional image, the provisional image to the display apparatus.

34. The image processing method according to claim 32, wherein:
    the local-side apparatus includes a computer, and
    the method further comprises:
        receiving, by the computer, information indicating a pen tip attribute from the remote-side apparatus; and switching, by the computer, a location for generating the provisional image from the pen input apparatus to the computer in a case where the pen input apparatus does not support the pen tip attribute received from the remote-side apparatus.

* * * * *